(12) United States Patent
Kaidu et al.

(10) Patent No.: US 10,530,280 B2
(45) Date of Patent: Jan. 7, 2020

(54) MOTOR DRIVING CONTROL DEVICE

(71) Applicant: MINEBEA MITSUMI Inc., Nagano (JP)

(72) Inventors: Hiroyuki Kaidu, Kakegawa (JP); Masato Aoki, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 17 days.

(21) Appl. No.: 16/101,599

(22) Filed: Aug. 13, 2018

(65) Prior Publication Data

US 2019/0068092 A1    Feb. 28, 2019

(30) Foreign Application Priority Data

Aug. 22, 2017 (JP) .................................. 2017-159581

(51) Int. Cl.
*H02P 6/17* (2016.01)
*H02P 6/15* (2016.01)
*H02P 6/28* (2016.01)
*H02P 6/182* (2016.01)

(52) U.S. Cl.
CPC ................ *H02P 6/17* (2016.02); *H02P 6/157* (2016.02); *H02P 6/182* (2013.01); *H02P 6/28* (2016.02)

(58) Field of Classification Search
CPC .... H02P 6/17; H02P 6/157; H02P 6/28; H02P 6/182

USPC .......................................................... 318/490
See application file for complete search history.

(56) References Cited

U.S. PATENT DOCUMENTS

| 5,168,439 | A | * | 12/1992 | Kumar | .............. | H02M 7/53873 318/811 |
| 5,329,217 | A | * | 7/1994 | Kerkman | .......... | H02M 7/53875 318/811 |
| 2017/0279387 | A1 | * | 9/2017 | Kaidu | ....................... | H02P 6/17 |

FOREIGN PATENT DOCUMENTS

| JP | 2011-055651 A | | 3/2011 | | |
| JP | 2016213988 A | * | 12/2016 | ................ | H02P 6/16 |

* cited by examiner

*Primary Examiner* — Kawing Chan
(74) *Attorney, Agent, or Firm* — Pearne & Gordon LLP

(57) ABSTRACT

A motor driving control device includes a motor driving unit to drive the motor, a rotational position detecting circuit for generating rotational position information, and a controller. The controller outputs, to the motor driving unit, a first drive control signal for controlling an adjustment at a time of energization switching to reduce resonance between a natural frequency of the motor and a rotational component of the motor based on the rotational position information when an actual rotational speed of the motor is equal to or higher than a predetermined rotational speed lower than a target rotational speed, and outputs, to the driving unit, a second drive control signal for controlling regular energization switching without performing the adjustment at the time of energization switching when the actual rotational speed is less than the predetermined rotational speed and a set duty is within an error range of a maximum value.

13 Claims, 15 Drawing Sheets

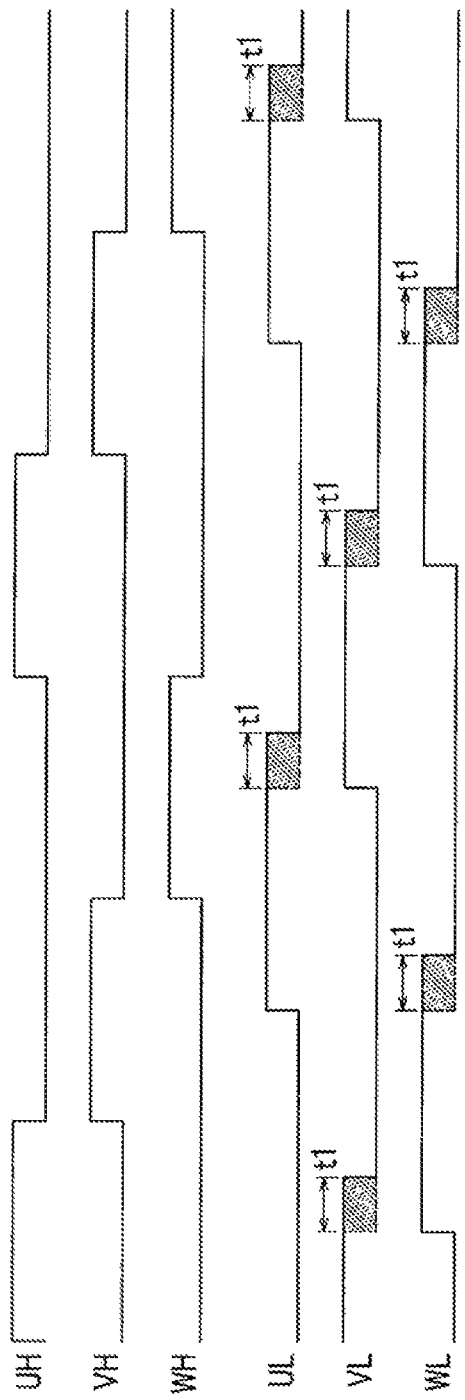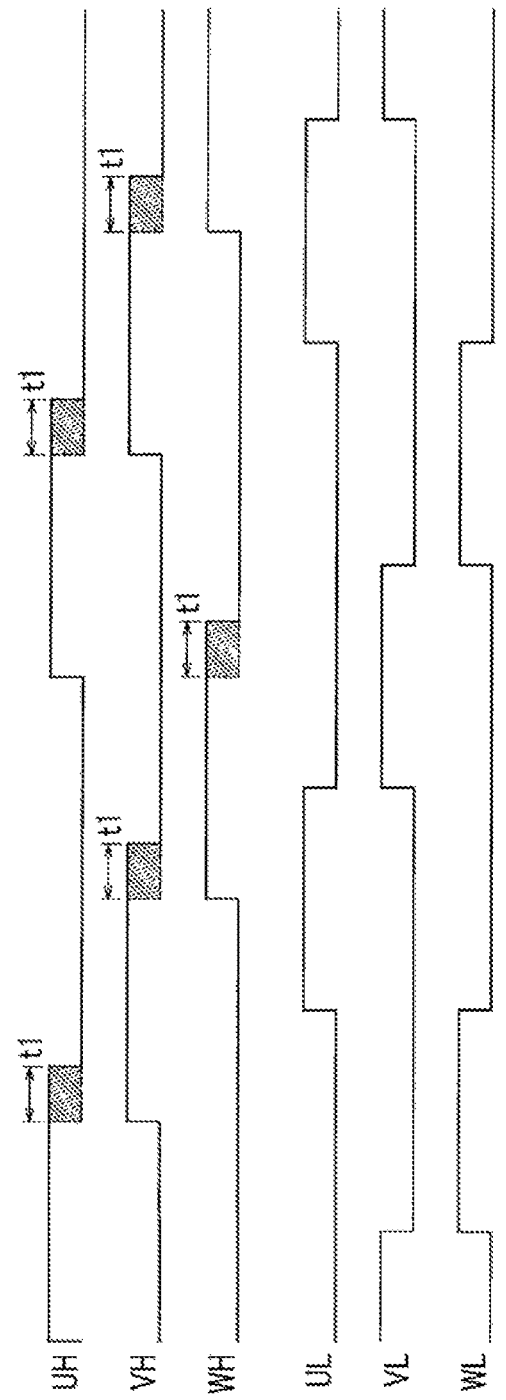

MOTOR DRIVING CONTROL DEVICE

CROSS REFERENCE TO RELATED APPLICATIONS

This application claims the benefit of Japanese Patent Application No. 2017-159581, filed Aug. 22, 2017, which is hereby incorporated by reference in its entirety.

BACKGROUND

Technical Field

The present disclosure relates to a motor driving control device.

Background

In general motors driven by switching energization to coils, an electromagnetic vibration component caused by energization switching is one of main causes for vibration deterioration, and countermeasures are required.

In a motor having a fixed operating rotational speed, the vibration deterioration can be avoided by avoiding resonance at the operating rotational speed. However, the above method cannot be used for motors such as an axial flow fan motor. In these motors, a vibration peak value at any rotational speed between stoppage condition and the maximum rotational speed must be suppressed to a fixed value or less like the axial flow fan motor, and thus it has been difficult to find any countermeasure.

A motor control device for suppressing occurrence of noise evoked by vibration of a stator caused by resonance with the natural frequency of a motor is described in Japanese Patent Laid-Open No. 2011-55651. The motor control device disclosed in Japanese Patent Laid-Open No. 2011-55651 includes a rotational speed calculator for calculating the rotational speed of a rotor, and a modulation rate adjuster for adjusting a modulation rate for an inverter based on the rotational speed calculated by the rotational speed calculator and the natural frequency of the stator. This motor control device aims to prevent occurrence of a resonance phenomenon between the frequencies of harmonic components and the natural frequency F of the stator, thereby suppressing occurrence of noise caused by the vibration of the stator.

It is required for the motor control device described in Japanese Patent Laid-Open No. 2011-55651 to adjust the modulation rate for the inverter at each frequency of a PWM (Pulse Width Modulation) signal as in the case of 180° energization. Therefore, a microcomputer having high processing capability is required, resulting in increase of the cost.

The present disclosure is related to providing a motor driving control device capable of avoiding resonance with the natural frequency of a motor occurring within a predetermined rotational speed range and ensuring a desired rotational speed in spite of an inexpensive configuration.

SUMMARY

According to an aspect of the present disclosure, a motor driving control device comprises: a motor driving unit for applying a voltage to each phase of a motor to drive the motor, a rotational position detecting circuit for detecting a rotational position of a rotor and generating rotational position information; and a controller for outputting a drive control signal for controlling driving of the motor driving unit to the motor driving unit. The controller outputs, to the motor driving unit, a first drive control signal as the drive control signal for controlling an adjustment at a time of energization switching to reduce resonance between a natural frequency of the motor and a rotational component of the motor based on the rotational position information detected by the rotational position detecting circuit when an actual rotational speed of the motor is equal to or higher than a predetermined rotational speed lower than a target rotational speed, and outputs, to the driving unit, a second drive control signal for controlling regular energization switching without performing the adjustment at the time of energization switching when the actual rotational speed is less than the predetermined rotational speed and a set duty is within an error range of a maximum value.

Other units will be described in the following embodiments.

According to the present disclosure, it is possible to provide a motor driving control device capable of avoiding resonance with the natural frequency of a motor occurring in a predetermined rotational speed range and ensuring a desired rotational speed in spite of an inexpensive configuration.

BRIEF DESCRIPTION OF THE DRAWINGS

FIGS. 9A and 9B are diagrams showing driving waveforms in a second embodiment.

DETAILED DESCRIPTION

Embodiments according to the present disclosure will be described hereunder in detail with reference to the drawings.

First Embodiment

The motor driving control device 1 of the present embodiment performs energization control (advance angle/delay angle adjustment control).

Figure 1:
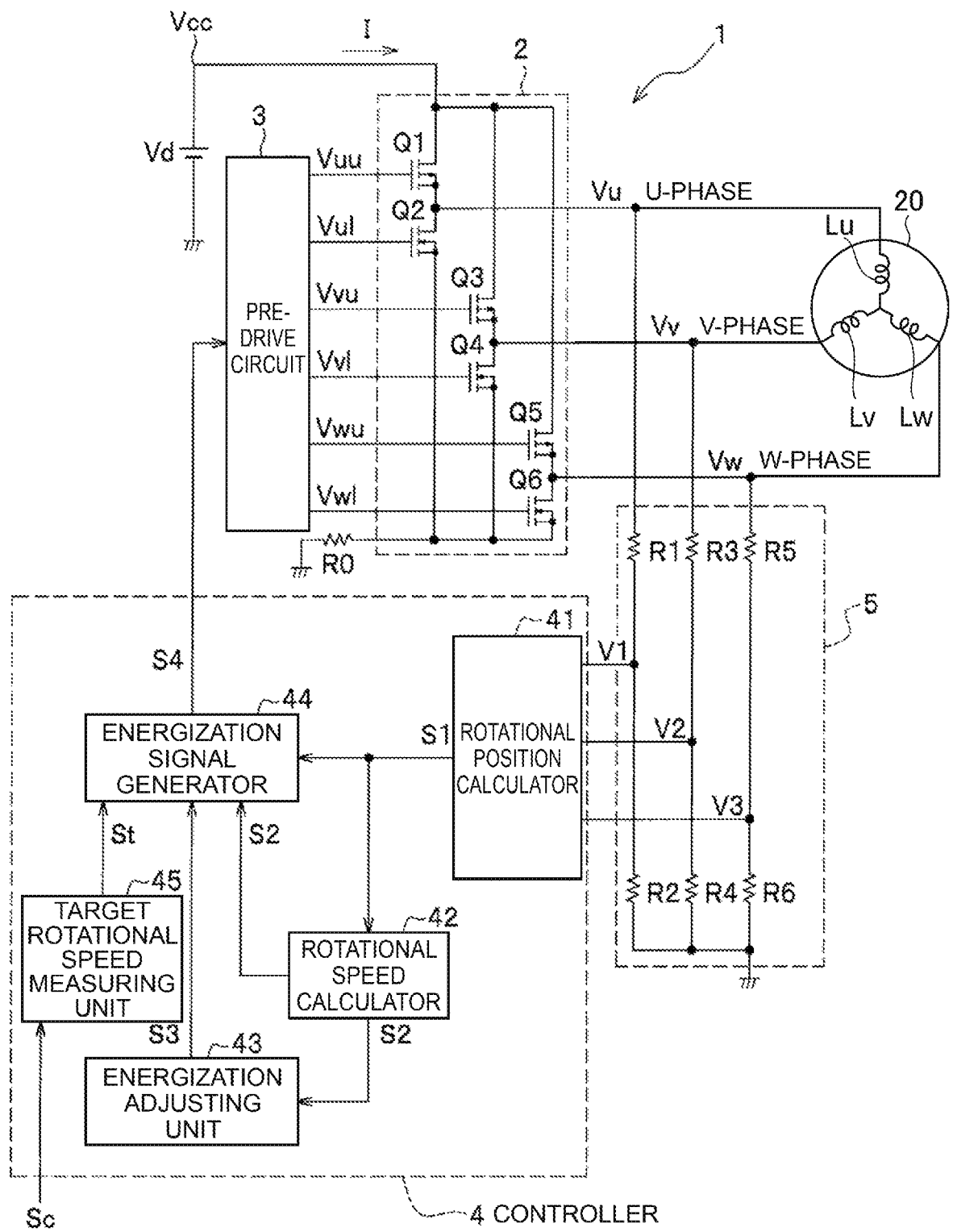
FIG. 1 is a block diagram showing a circuit configuration of a motor driving control device according to a first embodiment of the present disclosure.

FIG. 1 is a block diagram showing a circuit configuration of a motor driving control device 1 according to the first embodiment.

In FIG. 1, a motor 20 according to the present embodiment is a three-phase brushless DC motor, and includes coils Lu, Lv, and Lw of respective phases, and a rotor (not shown). One ends of the coils Lu, Lv, and Lw are connected to each other in Y-connection mode. The other ends of the coils Lu, Lv, and Lw are connected to a U phase output, a V phase output, and a W phase output of an inverter circuit 2 respectively, and supplied with a three-phase AC from the inverter circuit 2, whereby the motor 20 is rotationally driven.

The motor driving control device 1 includes a motor driving unit (the inverter circuit 2 and a pre-drive circuit 3) for driving the motor 20, and a rotational position detecting circuit 5 for detecting the rotational position of the rotor to generate rotational position information. The motor driving control device 1 further includes a controller 4 for outputting, to the motor driving unit, a drive control signal S4 (described later) for controlling the driving of the motor driving unit.

The motor driving control device 1 is connected to a DC power supply Vd, and is connected to the motor 20 by three phases of U-phase wiring, V-phase wiring and W-phase wiring. The motor driving control device 1 applies a drive voltage to the motor 20 to control the rotation of the motor 20. Inter-terminal voltages Vu, Vv, and Vw are applied to the U-phase, V-phase and W-phase, respectively.

The motor driving unit includes the inverter circuit 2 and the pre-drive circuit 3. The DC power supply Vd supplies a power supply voltage Vcc to the motor driving unit to supply power. The motor driving unit receives the power supply from the DC power supply Vd, and supplies a driving current to the coils Lu, Lv, and Lw of the U-phase, the V-phase, and the W-phase of the motor 20 based on the drive control signal S4 from the controller 4 to rotate the rotor. The motor driving unit drives the motor 20, for example, according to a sinusoidal wave drive method.

The inverter circuit 2 (a part of the motor driving unit) is connected to the pre-drive circuit 3 (a part of the motor driving unit) and the coils Lu, Lv, and Lw of the respective phases possessed by the motor 20. The inverter circuit 2 energizes the coils Lu, Lv, and Lw of the respective phases of the motor 20 based on the drive signals Vuu to Vwl of the pre-drive circuit 3.

The inverter circuit 2 includes a U-phase switching leg, a V-phase switching leg, and a W-phase switching leg. In the U-phase switching leg, switching elements Q1 and Q2 are connected to each other in series. In the V-phase switching leg, switching elements Q3 and Q4 are connected to each other in series. In the W-phase switching leg, switching elements Q5 and Q6 are connected to each other in series. These switching elements Q1 to Q6 are, for example, FETs (Field Effect Transistors).

In the inverter circuit 2, the U-phase, V-phase and W-phase switching legs have the switching elements Q1, Q3 and Q5 on an upper arm side and the switching elements Q2, Q4 and Q6 on a lower arm side, respectively. Each of the drain terminals of the switching elements Q1, Q3, and Q5 is connected to a positive electrode of the DC power supply Vd. The source terminals of the switching elements Q1, Q3, and Q5 are connected to the drain terminals of the switching elements Q2, Q4, and Q6, respectively, and AC signals of the U-phase, the V-phase and the W-phase are output from the connection points between the source terminals and the drain terminals, respectively. Each of the source terminals of the switching elements Q2, Q4, and Q6 is connected to the ground (the negative electrode of the DC power supply Vd) via a resistor R0. Each of the gate terminals of the switching elements Q1 to Q6 is connected to the pre-drive circuit 3.

The inverter circuit 2 receives power supply from the DC power supply Vd, and when the drive signals Vuu to Vwl are inputted from the pre-drive circuit 3, the inverter circuit 2 makes the driving current flow to the U-phase wiring, the V-phase wiring and the W-phase wiring of the motor 20.

The pre-drive circuit 3 is connected to the controller 4. The pre-drive circuit 3 includes, for example, six gate drive circuits, and generates drive signals Vuu to Vwl for driving the inverter circuit 2.

The controller 4 includes a rotational position calculator 41, a rotational speed calculator 42, an energization adjusting unit 43, an energization signal generator 44, and a target rotational speed measuring unit 45, and is included in a microcomputer. Each unit may be realized by software, and virtually represent each function. The controller 4 outputs a drive control signal S4 for controlling the driving of the motor driving unit (the pre-drive circuit 3 and the inverter circuit 2). Specifically, when the actual rotational speed of the motor 20 is equal to or higher than a predetermined rotational speed lower than the target rotational speed, the controller 4 outputs, to the pre-drive circuit 3, a drive control signal S4 (a first drive control signal) for controlling an adjustment at the time of energization switching to reduce the resonance between the natural frequency of the motor 20 and the rotational component of the motor 20 based on phase-voltages V1, V2, and V3 detected by the rotational position detecting circuit 5 (an example of the rotational position information). When the actual rotational speed is less than the predetermined rotational speed and the set duty is within an error range of a maximum value, the controller 4 outputs a drive control signal S4 (a second drive control signal) for controlling regular energization switching to the pre-drive circuit 3 without performing the adjustment at the time of energization switching.

The rotational position calculator 41 receives rotational position information (phase voltages V1, V2, V3) of the rotor detected by the rotational position detecting circuit 5 including resistive elements R1 to R6, and generates a position detection signal S1 corresponding to the rotational position information (an example of a signal corresponding to the rotational position information). In the present embodiment, the rotational position detecting circuit 5 detects back electromotive force of each phase to detect the rotational position. The method of detecting the rotational position is not limited to the configuration for detecting the back electromotive force as in the case of the present embodiment, but may be a configuration for detecting the rotational position by using various kinds of sensors such as a Hall sensor.

The rotational speed calculator 42 calculates the rotational speed based on the position detection signal S1, generates the rotational speed information S2 (an example of the actual rotational speed), and outputs the rotational speed information S2 to the energization adjusting unit 43 and the energization signal generator 44.

When the actual rotational speed is equal to or higher than a predetermined rotational speed lower than the target rotational speed, the energization adjusting unit 43 generates an energization adjustment signal S3 for performing the adjustment at the time of energization switching based on the rotational speed information S2 output from the rotational speed calculator 42, and outputs the energization adjustment signal S3 to the energization signal generator 44. When the actual rotational speed is less than the predetermined rotational speed and the set duty is within the error range of the maximum value, the energization adjusting unit 43 does not output any energization adjustment signal S3. In the present embodiment, when the actual rotational speed of the motor 20 is within a predetermined rotational speed range, the energization adjusting unit 43 generates and outputs the energization adjustment signal S3 for adjusting the advance angle and the delay angle based on the rotational speed information S2 output from the rotational speed calculator 42. In the present embodiment, the predetermined rotational speed is included in the predetermined rotational speed range.

The energization signal generator 44 receives the position detection signal S1, the rotational speed information S2, the energization adjustment signal S3, and a target rotational speed signal St (an example of a signal corresponding to the target rotational speed), and generates the drive control signal S4 (the first drive control signal or the second drive control signal) based on the above signals. The energization signal generator 44 generates a set duty and a PWM signal, and compares the target rotational speed and the actual rotational speed.

When the actual rotational speed is equal to or higher than the predetermined rotational speed lower than the target rotational speed, the energization signal generator 44 outputs, to the pre-drive circuit 3, the drive control signal S4 (the first drive control signal) for controlling the adjustment at the time of energization switching to reduce the resonance between the natural frequency of the motor 20 and the rotational component of the motor 20 based on the position detection signal S1 output from the rotational position calculator 41 (that is, the rotational position information detected by the rotational position detecting circuit 5). When the actual rotational speed is less than the predetermined rotational speed lower than the target rotational speed and the set duty is within the error range of the maximum value, the energization signal generator 44 does not perform the adjustment at the time of energization switching, but outputs the drive control signal S4 (the second drive control signal) for controlling the regular energization switching to the pre-drive circuit 3. Here, the regular energization control means normal energization control for switching an energization pattern at a predetermined timing and in a predetermined order based on the rotational position information detected by the rotational position detecting circuit 5.

When the set duty of the drive control signal S4 is out of the error range of the maximum value, the energization signal generator 44 outputs, to the pre-drive circuit 3, the drive control signal S4 (the first drive control signal) for controlling the adjustment at the time of energization switching to reduce the resonance between the natural frequency of the motor 20 and the rotational component of the motor 20.

The target rotational speed measuring unit 45 receives target rotational speed information Sc from the outside, measures the target rotational speed, and outputs the target rotational speed signal St corresponding to the target rotational speed to the energization signal generator 44.

The controller 4 (specifically, the energization signal generator 44) outputs, to the pre-drive circuit 3, the drive control signal S4 (the first drive control signal) for performing an adjustment by repeating the advance angle and the delay angle at the time of energization switching in a predetermined pattern as the adjustment at the time of energization switching based on the position detection signal S1 output from the rotational position calculator 41 (that is, the rotational position information (the phase voltages V1, V2, and V3) detected by the rotational position detecting circuit 5) and the energization adjustment signal S3 output from the energization adjusting unit 43.

In the specification, the advance angle is to shorten the energization period, and the delay angle is to lengthen the energization period.

Specifically, the controller 4 performs the following adjustment at the time of energization switching.

When the rotational speed of the motor 20 is within the predetermined rotational speed range, the controller 4 performs an adjustment by repeating the advance angle and the delay angle at the time of energization switching in a predetermined pattern. In the present disclosure, one rotation is set as one cycle, and a phenomenon occurring once per cycle is regarded as a primary component. A cycle corresponding to an energization switching frequency n per rotation of the rotor is defined as an n-th order component, and this is called as a rotational component. The predetermined rotational speed range includes a range causing a resonance phenomenon between the n-th order component and the natural frequency of the motor 20.

The controller 4 outputs the drive control signal S4 (the first drive control signal) so as to reduce the power supply current of the n-th order component corresponding to the energization switching frequency n per rotation of the rotor.

The controller 4 controls the motor driving unit so that the motor driving unit alternately performs the advance angle adjustment and the delay angle adjustment at the time of energization switching as the adjustment at the time of energization switching. As a result, in the motor driving control device 1, the power supply current of the (n/2)-th order component increases, but the power supply current of the n-th order component decreases.

Hereinafter, the operation of the motor driving control device 1 configured as described above will be described.

First, the basic idea of the present disclosure will be described.

Generally, in order to drive the motor efficiently, the current waveform uniformly should be unified evenly. However, when the current waveform is unified uniformly without unevenness, the energization timings are precisely aligned with one another, and as a result, a certain rotational order component is generated.

For example, in the case of a brushless motor with 6 poles and 9 slots, 18 energization switching operations occur per rotation. Therefore, when the current waveform is analyzed by FFT (Fast Fourier Transform), ideally only an 18-th order component occurs. This 18-th order component resonates with the eigenvalue (natural frequency) of the motor 20, resulting in a large electromagnetic vibration component.

Here, the energization switching frequency per rotation is obtained by multiplying one half of the number of poles by the energization switching frequency per pole (for example, six times in the case of three phases).

The present disclosure adjusts so as to repeat the advance angle and the delay angle at the time of energization switching in a predetermined pattern in the predetermined rotational speed range as the adjustment at the time of energization switching. As a result, the n-th order component corresponding to the energization switching frequency n per rotation of the rotor causing occurrence of the electromagnetic vibration component is transferred to another order component, whereby the electromagnetic vibration component can be suppressed.

For example, in the case of the brushless motor with 6 poles and 9 slots, the energization waveform is controlled so that the advance angle adjustment and the delay angle adjustment are alternately performed at each energization switching timing in a specific rotational speed region causing the 18-th order component to resonate with the eigenvalue of the motor. As a result, the power supply current of the ninth order component having half of the frequency of the 18-th order component increases. The power supply current of the ninth order component increases whereas the power supply current of the 18-th order component is suppressed. As a result, the resonance with the natural frequency of the motor can be avoided.

Next, the operation of the motor driving control device 1 according to the present embodiment will be described.

Comparative Example

Figure 2:
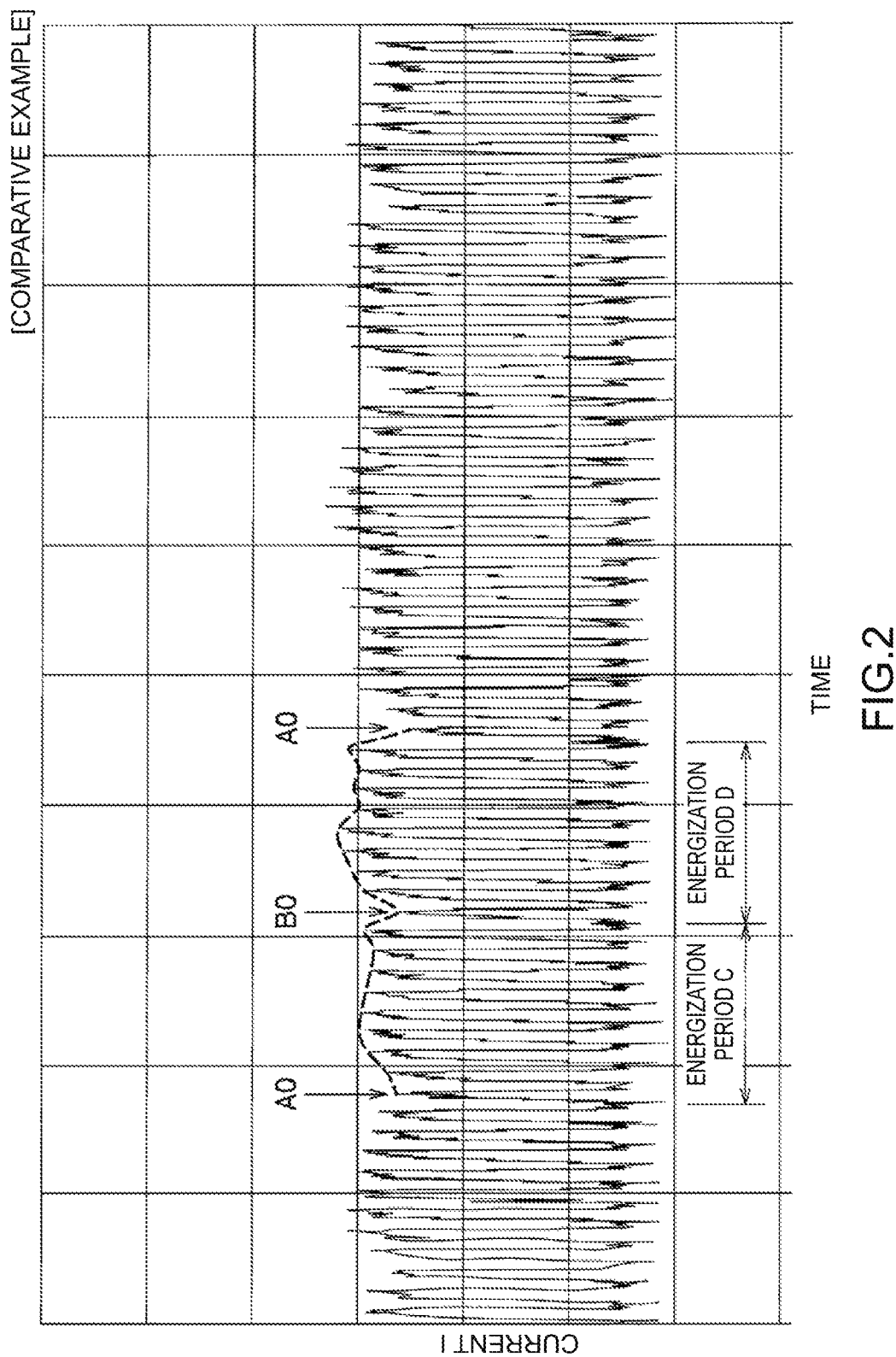
FIG. 2 is a power current waveform diagram of a brushless motor with 6 poles and 9 slots in a comparative example.

FIG. 2 is a power supply current waveform diagram of a brushless motor with 6 poles and 9 slots as a comparative example. The ordinate axis in FIG. 2 represents the current waveform of current I in FIG. 1, and the abscissa axis represents the time.

Reference signs A0 and B0 in FIG. 2 represent energization switching timings of the brushless motor with 6 poles and 9 slots. FIG. 2 shows the waveform of the power supply current when energization switching is periodically performed.

As shown in FIG. 2, an energization period C between the energization switching timings A0 and B0 and an energization period D between the energization switching timings B0 and A0 have substantially the same length. Furthermore, a broken line in FIG. 2 represents an envelope connecting the maximum amplitudes of the current waveform, and a similar current waveform is repeated at each energization switching timing.

Motor Driving Control Device of the Present Embodiment

Figure 3:
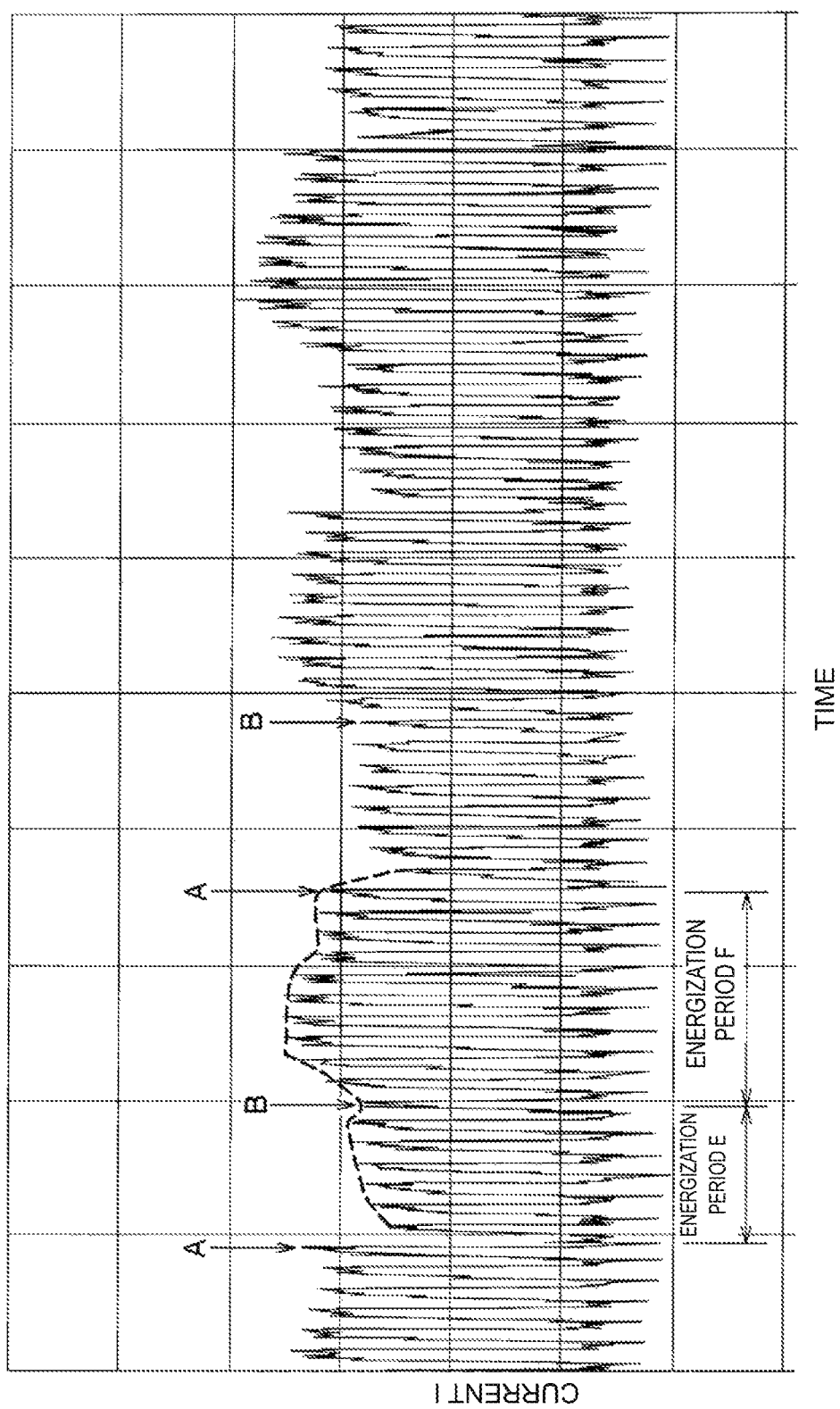
FIG. 3 is a power current waveform diagram of the motor driving control device according to the first embodiment.

FIG. 3 is a power supply current waveform diagram of the motor driving control device 1 of the present embodiment, and corresponds to the power supply current waveform diagram of the comparative example of FIG. 2. The ordinate axis in FIG. 3 represents the current waveform of the current I of FIG. 1, and the abscissa axis represents the time.

Reference signs A and B in FIG. 3 represent energization switching timings based on the advance angle/delay angle adjustment of the present embodiment.

In the present embodiment, the power supply current of the (n/2)-th order component is increased, and the power supply current of the n-th order component is reduced. Here, a case wherein energization switching for making the ninth order component be included is performed to reduce the 18-th order component will be exemplified.

In order to make the ninth order component be included, the energization switching is performed such that the amplitude of current is increased once per two times at the time of energization switching. As an example, the advance angle and the delay angle at the time of energization switching are adjusted to be repeated in a predetermined pattern (for example, alternately). Specifically, the following control is performed.

<Advance Angle/Delay Angle Adjustment>
(1) As shown in FIG. 3, at the energization switching timing A, delay angle control for switching energization later than usual is performed.
(2) As shown in FIG. 3, at the energization switching timing B, advance angle control for switching energization more early than usual is performed.
(3) The advance angle/delay angle adjustments of the above (1) and (2) are repeated in a predetermined pattern (here, alternately). That is, the delay angle amount at the energization switching timing A in the foregoing (1) is canceled by the advance angle amount at the next energization switching timing B. For this reason, the advance angle/delay angle has no influence in terms of energization switching per rotation of the rotor.

Specifically, as shown in FIG. 3, an energization period E between the energization switching timings A and B and an energization period F between the energization switching timings B and A have different lengths. The energization period E is shorter than a normal period, and the energization period D is longer than the normal period. By setting the total of the energization period E and the energization period F to the same as the period of two normal energization switching operations, the advance angle/delay angle has no influence around one rotation of the rotor.

The delay angle control at the time of energization switching on the low side and the advance angle control at the time of energization switching on the high side are merely examples, and the energization switching at the low side and the energization switching at the high side may be interchanged by each other. In this case, the advance angle control is performed at the time of energization switching on the low side, and the delay angle control is performed at the time of energization switching on the high side.

In the alternately repetitive pattern of the advance angle and the delay angle described above, the power supply current of the n-th order component (in the present example, the 18-th order component) at the energization switching frequency n per rotation of the rotor can be reduced by increasing the power supply current of the (n/2)-th order component (in the present example, the ninth order component). In addition, the pattern for the advance angle/delay angle adjustment may be merely a predetermined pattern, and the pattern may also include a non-alternate pattern. For example, the advance angle/delay angle adjustment described above is performed, but the advance angle/delay angle adjustment at subsequent several energization switching operations is not performed, and then the advance angle/delay angle adjustment is performed at a further subsequent energization switching operation.

A broken line in FIG. 3 shows an envelope connecting maximum amplitudes of current waveforms. As indicated by this envelope, the amplitude of the current becomes larger at the energization switching timing A, but the amplitude of the current becomes smaller at the energization switching timing B than that at the normal energization switching time. As a result, the cycle per rotation can be set to be halved by performing the advance angle adjustment and the delay angle adjustment such that one large cycle exists between the energization period E and the energization period F.

Figure 4:
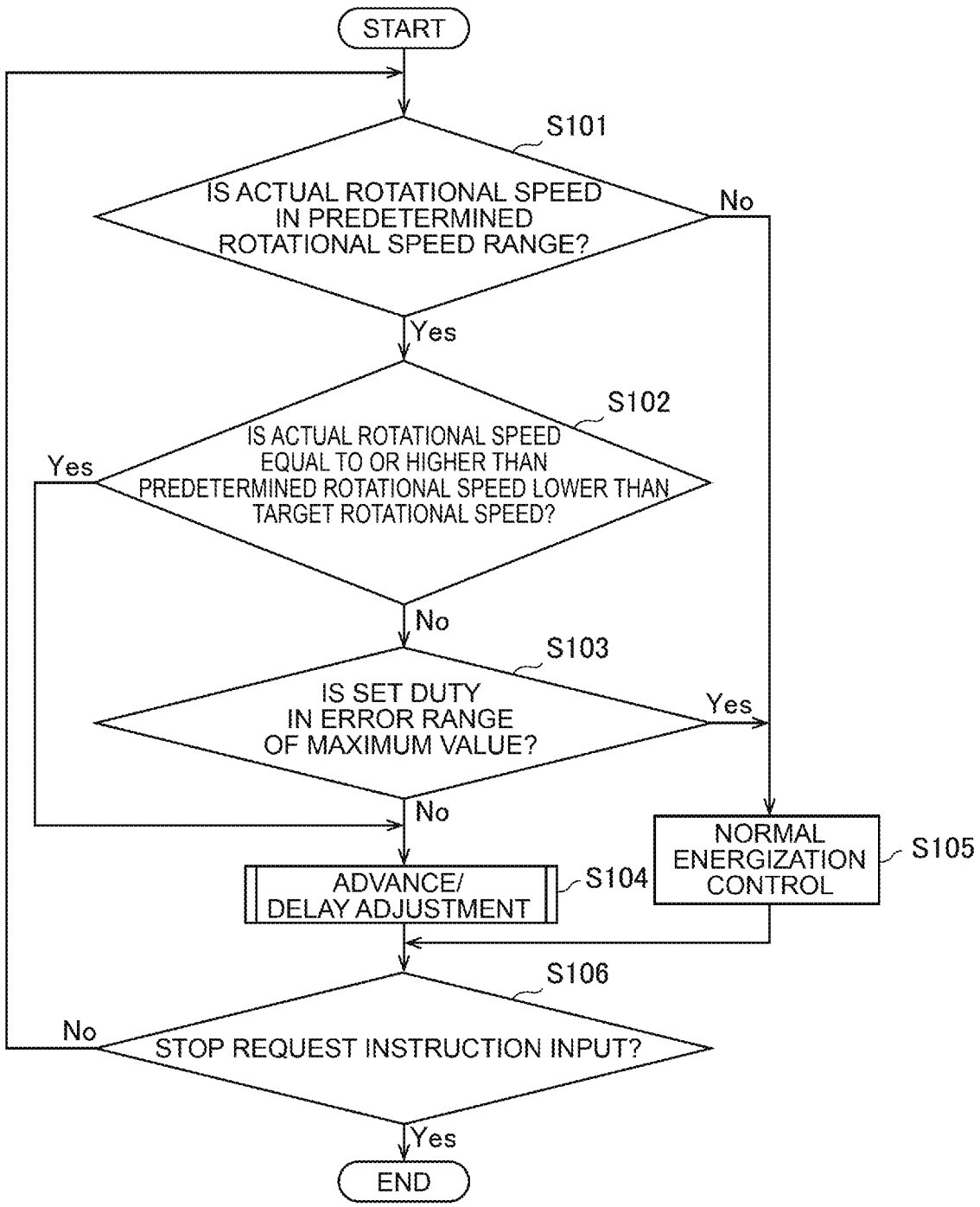
FIG. 4 is a flowchart (main flow) showing energization control of the motor driving control device according to the first embodiment.
Figure 5A:
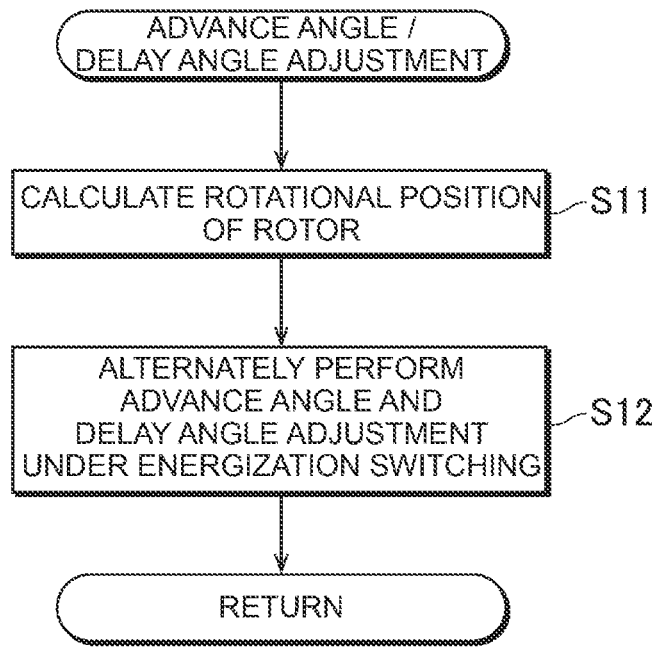
FIGS. 5A and 5B are flowcharts (sub routines) showing energization control of the motor driving control device according to the first embodiment.
Figure 5B:
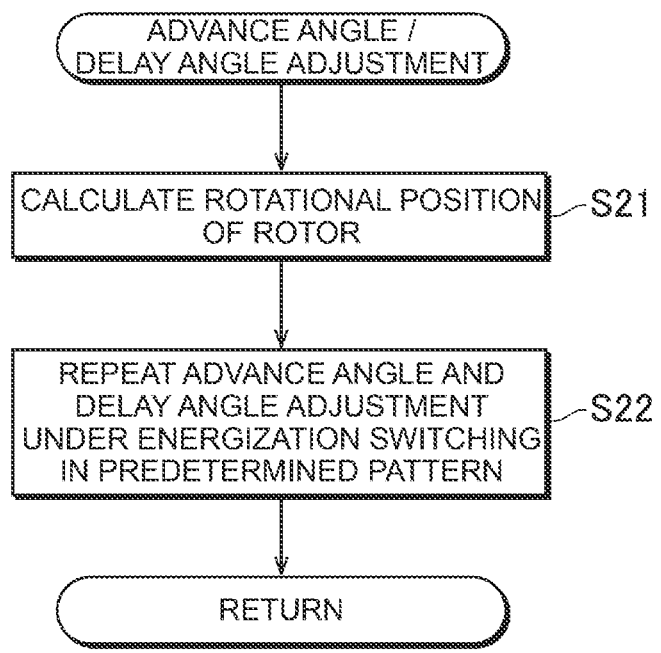

FIGS. 4 and 5 are flow charts showing the energization control of the motor driving control device 1 according to the present embodiment. FIG. 4 shows a main flow of the flowchart, and FIGS. 5A and 5B show flows of the advance angle/delay angle adjustment (step S104) as subroutines of FIG. 4. The flow of FIG. 4 is repeatedly executed at each predetermined timing in the controller 4 (see FIG. 1).

In step S101, the controller 4 determines whether the actual rotational speed of the motor 20 (see FIG. 1) is within a predetermined rotational speed range. The predetermined rotational speed range includes a range described as follows. In the range, the n-th order component corresponding to the energization switching frequency n per rotation of the rotor and the natural frequency of the motor 20 cause a resonance phenomenon. The rotational position calculator 41 (see FIG. 1) generates the position detection signal S1 corresponding to the rotational position information (phase voltages V1, V2, and V3) from the rotational position detecting circuit 5, the rotational speed calculator 42 calculates the rotational speed based on the position detection signal S1 to generate the rotational speed information S2, thereby calculating the rotational speed of the motor 20. Further, the target rotational speed measuring unit 45 receives the target rotational speed information Sc from the outside, measures the target rotational speed, and outputs the target rotational speed signal St corresponding to the target rotational speed to the energization signal generator 44.

When the actual rotational speed of the motor 20 is within a predetermined rotational speed range (YES in step S101), the controller 4 proceeds to the processing in step S102. When the actual rotational speed of the motor 20 is out of the predetermined rotational speed range (No in step S101), the controller 4 performs normal energization control (step S105), and then proceeds to the processing in step S106. The normal energization control in step S105 means that the drive control signal S4 (the second drive control signal) for controlling the regular energization switching is output without performing the adjustment at the time of energization switching.

In step S102, the energization signal generator 44 determines whether the actual rotational speed is equal to or higher than the predetermined rotational speed lower than the target rotational speed. As a result, the energization signal generator 44 can determine whether the actual rotational speed has reached an allowable range of the target rotational speed (for example, 98% or more of the target rotational speed). The allowable range (98%) is an example, and is not limited.

When the actual rotational speed of the motor 20 is equal to or higher than the predetermined rotational speed (Yes in step S102), the controller 4 proceeds to the processing in step S104 to perform the advance angle/delay angle adjustment. When the actual rotational speed of the motor 20 is less than the predetermined rotational speed (the actual rotational speed is out of the allowable range of the target rotational speed) (No in step S102), the controller 4 proceeds to the processing in step S103.

In step S103, the energization signal generator 44 determines whether the set duty of the drive control signal S4 is within an error range of a maximum value (for example, between 100% and 98% in duty). The error range (from 100% to 98% in duty) is an example, and is not limited.

When the set duty is out of the error range of the maximum value (No in step S103), the controller 4 proceeds to the processing in step S104 to perform the advance angle/delay angle adjustment. When the set duty is within the error range of the maximum value (Yes in step S103), the controller 4 performs the normal energization control (step S105), and then proceeds to the processing in step S106.

In order to suppress the electromagnetic vibration component resonating with the natural frequency of the motor 20, the controller 4 performs the advance angle/delay angle adjustment as the adjustment at the time of energization switching in step S104. Specifically, based on the rotational speed information S2 output from the rotational speed calculator 42, the energization adjusting unit 43 (see FIG. 1) generates the energization adjustment signal S3 for adjusting the advance angle and the delay angle at the time of energization switching when the actual rotational speed of the motor 20 is equal to or higher than a predetermined rotational speed. The energization adjustment signal S3 is a signal for performing the adjustment at the time of energization switching to reduce the resonance between the natural frequency of the motor 20 and the rotational component of the motor 20. The energization signal generator 44 receives the position detection signal S1, the rotational speed information S2 (actual rotational speed), the energization adjustment signal S3, and the target rotation speed signal St, and generates the drive control signal S4 (the first drive control signal) for controlling the advance angle and the delay angle so that the advance angle and the delay angle are repeated in a predetermined pattern.

The advance angle/delay angle adjustment in step S104 described above causes the advance angle and the delay angle to be forcedly repeated in a predetermined pattern within a predetermined rotational speed range. Details will be described later. After the advance angle/delay angle adjustment is performed, the processing proceeds to step S106.

In step S106, the controller 4 determines whether a stop request command is input, and when the stop request command is input (Yes), the controller 4 finishes the present flow. When the stop request command is not input (No), the controller 4 returns the processing to step S101 to determine whether the actual rotational speed of the motor 20 is within the predetermined rotational speed range, and continues the processing.

As described above, when the actual rotational speed of the motor 20 is equal to or higher than the predetermined rotational speed, the controller 4 outputs, to the pre-drive circuit 3, the drive control signal S4 (first drive control signal) for controlling the adjustment at the time of energization switching to reduce the resonance between the natural frequency of the motor 20 and the rotational component of the motor 20 based on the detected rotational position information, and performs the advance angle/delay angle adjustment. On the other hand, when the actual rotational speed is less than the predetermined rotational speed and the set duty is within the error range of the maximum value, the controller 4 outputs, to the pre-drive circuit 3, the drive control signal S4 (second drive control signal) for controlling the regular energization switching without performing the adjustment at the time of energization switching. The case where the set duty of the drive control signal S4 is within the error range of the maximum value means, for example, that the duty is in the range from 100% to 98%.

Next, the advance angle/delay angle adjustment (step S104) in FIG. 4 will be specifically described.

The advance angle/delay angle adjustment is performed by repeating the advance angle and the delay angle at the switching time in a predetermined pattern, and will be exemplified as follows.

Advance Angle/Delay Angle Adjustment Example 1

As shown in FIG. 5A, the rotational position calculator 41 calculates the rotational position of the rotor in step S11.

In step S12, the energization adjusting unit 43 alternately performs the advance angle adjustment and the delay angle adjustment at the time of energization switching, based on the rotational position of the rotor.

This makes it possible to increase the power supply current of the (n/2)-th order component, so that the power supply current of the n-th order component can be reduced. For example, the power supply current of the 18-th order component can be reduced by increasing the power supply current of the ninth order component.

Advance Angle/Delay Angle Adjustment Example 2

As shown in FIG. 5B, the rotational position calculator 41 calculates the rotational position of the rotor in step S21.

In step S22, the energization adjusting unit 43 repeats the advance angle adjustment and the delay angle adjustment at the time of energization switching in a predetermined pattern.

As a result, the power supply current of the n-th order component at the energization switching frequency n per rotation of the rotor can be reduced.

Figure 6:
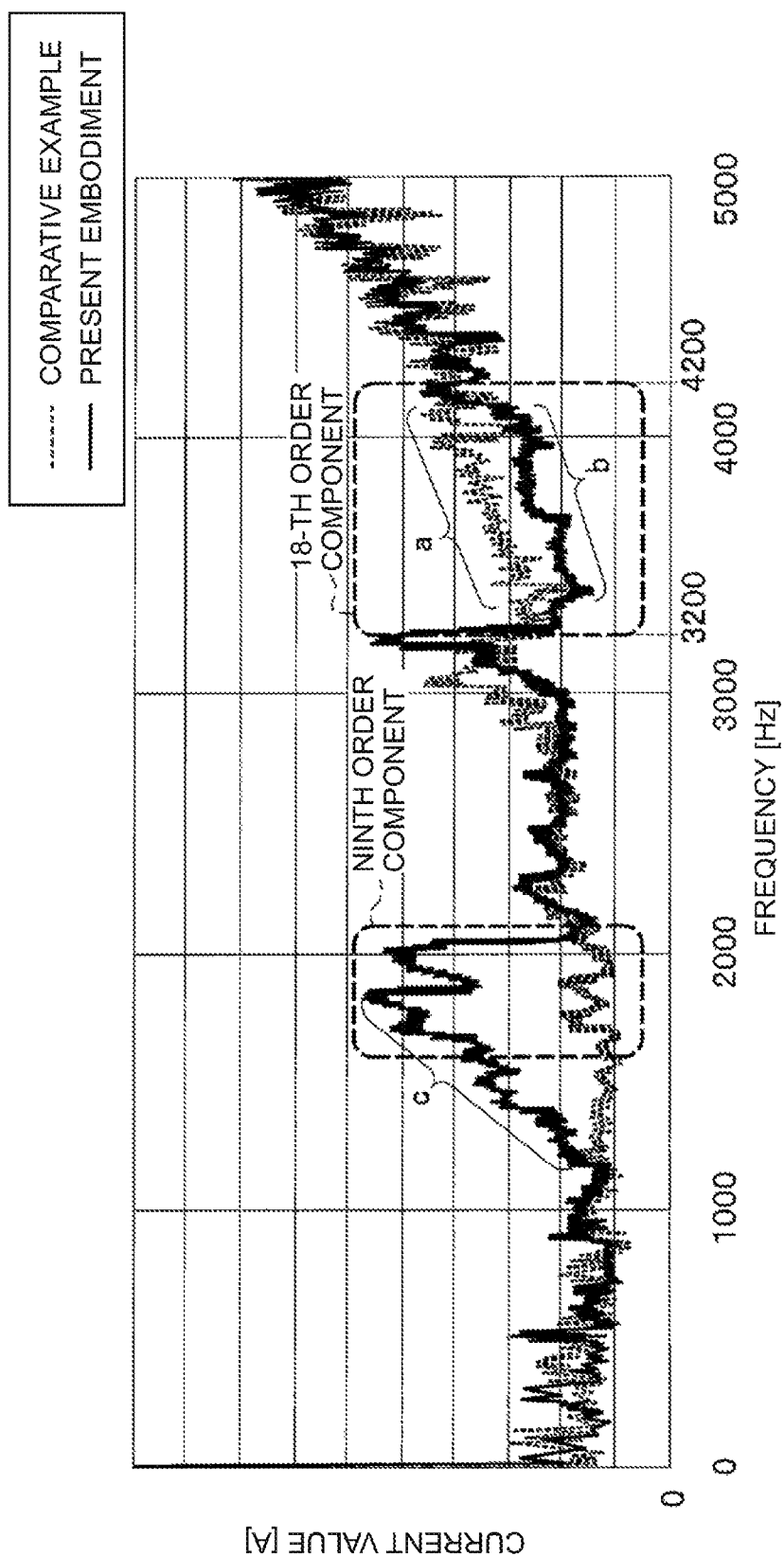
FIG. 6 is a frequency vs. current value characteristic diagram of the motor driving control device according to the first embodiment.

FIG. 6 is a graph showing a frequency vs. current value characteristic of the motor driving control device 1 of the present embodiment. FIG. 6 shows an FFT graph of a current waveform obtained by sweeping the rotational speed with a brushless motor with 6 poles and 9 slots. The ordinate axis in FIG. 6 represents the current value of the current I in FIG. 1, and the abscissa axis represents the frequency. The waveform indicated by a solid line in FIG. 6 represents the current waveform of the present embodiment, and the waveform indicated by a broken line represents the current waveform of a comparative example.

As indicated by a sign a in FIG. 6, in the comparative example, the 18-th order component occurs due to 18 energization switching operations per rotation of the rotor. As described above, this 18-th order component becomes a large electromagnetic vibration component by resonating with the eigenvalue (natural frequency) of the motor 20.

In the present embodiment, the ninth order component is increased by alternately performing the advance angle adjustment and the delay angle adjustment at the time of energization switching, thereby reducing the 18-th order component.

The following phenomenon occurs as the rotational speed of the motor 20 is changed. In the phenomenon, the resonance of the n-th order component with the natural frequency of the motor 20 occurs in a frequency range corresponding to the n-th order component corresponding to the energization switching frequency n in a predetermined rotational speed range. In the present embodiment, the resonance of the n-th order component can be avoided by suppressing the power supply current in the frequency range.

As indicated by an area enclosed with a broken line in FIG. 6, the current value in the frequency range (3200 Hz to 4200 Hz) corresponding to the 18-th order component is suppressed in the present embodiment (see reference sign b in FIG. 6). In FIG. 6, the resonance between the eigenvalue of the motor 20 and the 18-th order component is avoided by performing the energization control (the advance angle/delay angle adjustment) in the section of the predetermined rotational speed range (the range including the rotational speeds of 10667 rpm to 14000 rpm corresponding to the above frequency range).

However, as indicated by reference sign c in FIG. 6, in the present embodiment, the ninth order component increases. However, no electromagnetic vibration component occurs because the ninth order component does not resonate with the eigenvalue (natural frequency) of the motor 20. Furthermore, the frequency region in the vicinity of the ninth order component does not influence the system because the current value is small.

Here, the reason why the rotational speed range corresponding to the 18-th order component ranges from 10667 rpm to 14000 rpm in the present embodiment will be described.

The eigenvalue (natural frequency) of the motor 20 is assumed to be known by a measurement. Resonance with this natural frequency causes a large electromagnetic vibration component. In the case of FIG. 6, a resonance point (electromagnetic vibration component) exists between 3200 [Hz] and 4200 [Hz]. When these frequencies are converted to rotational speeds, they are converted to 3200 [Hz]× 60÷18=10667 [rpm] and 4200 [Hz]×60÷18=14000 [rpm].

That is, the lower limit Rmin [rpm] and the upper limit Rmax [rpm] of the rotational speed range corresponding to the frequency range of the n-th order component from f1 [Hz] to f2 [Hz] are converted to (f1×60÷n) [rpm] and (f2×60÷n) [rpm], respectively.

The predetermined rotational speed range is set so as to include the rotational speed range corresponding to at least the n-th order component, that is, so as to include a range causing a resonance phenomenon between the n-th order component and the natural frequency of the motor 20.

Figure 7:
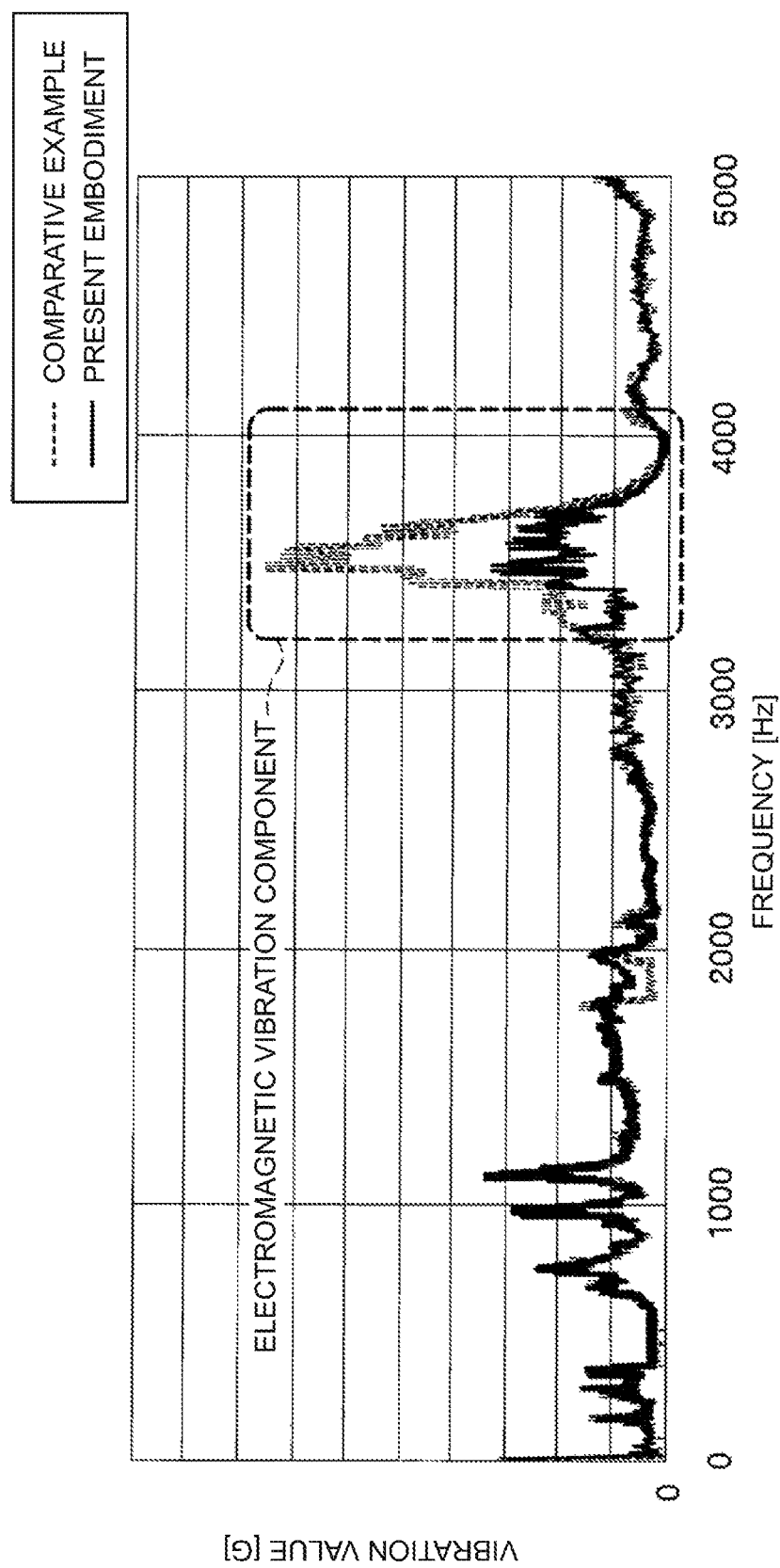
FIG. 7 is a frequency vs. vibration value characteristic diagram of the motor driving control device according to the first embodiment.

FIG. 7 is a graph of a frequency vs. vibration value characteristic of the motor driving control device 1 of the present embodiment. FIG. 7 shows the variation of a vibration value (peak values of the vibration component) with respect to the frequency in the rotation direction of the brushless motor with 6 poles and 9 slots. The ordinate axis of FIG. 7 represents the vibration value, and the abscissa axis represents the frequency. A waveform indicated by a solid line in FIG. 7 represents vibration values of the present embodiment, and a waveform indicated by a broken line represents vibration values of the comparative example.

In the frequency range of the electromagnetic vibration component corresponding to the 18-th order component surrounded by the broken line in FIG. 7, a large vibration reducing effect of enabling the vibration peak value to be reduced by 50% or more can be obtained.

As described above, the motor driving control device 1 of the present embodiment includes the motor driving unit for applying a voltage to each phase of the motor 20 to drive the motor 20, the rotational position detecting circuit 5 for detecting the rotational position of the rotor to generate the rotational position information, and the controller 4 for outputting the drive control signal for controlling the driving of the motor driving unit to the motor driving unit. When the actual rotational speed of the motor 20 is equal to or higher than the predetermined rotational speed lower than the target rotational speed, the controller 4 outputs the drive control signal S4 (first drive control signal) for controlling the adjustment at the time of energization switching to reduce the resonance between the natural frequency of the motor 20 and the rotational component of the motor 20 based on the rotational position information detected by the rotational position detecting circuit 5. On the other hand, when the actual rotational speed is less than the predetermined rotational speed lower than the target rotational speed (for example, 98% of the target rotational speed) and the PWM signal is within the error range of the maximum value of the set duty (for example, between 100% and 98% in duty), the controller 4 outputs the drive control signal S4 (the second drive control signal) for controlling the regular energization switching without performing the adjustment at the time of energization switching.

Here, since the advance angle/delay angle adjustment for performing an adjustment by repeating the advance angle and the delay angle at the time of energization switching in a predetermined pattern disturbs an energization waveform, the efficiency may be lowered, and thus it is difficult to obtain a desired rotational speed. In the present embodiment, when the actual rotational speed of the motor 20 is equal to or higher than the predetermined rotational speed lower than the target rotational speed, the controller 4 outputs the first drive control signal as the drive control signal S4, and maintains the foregoing advance angle/delay angle adjustment. On the other hand, when the actual rotational speed of the motor 20 is less than the predetermined rotational speed lower than the target rotational speed and the set duty is within the error range of the maximum value, the controller 4 outputs the second drive control signal as the drive control signal S4, and returns to the normal energization control. This makes it possible to avoid the resonance with the natural frequency of the motor 20 in the predetermined rotational speed range after approaching the actual rotational speed to the target rotational speed.

In particular, when it is determined that the actual rotational speed cannot be controlled to be equal to or higher than the predetermined rotational speed lower than the target rotational speed (including the meaning whereby the set duty is equal to the upper limit value and no remaining power exists), the output of the energization adjustment signal S3 is stopped (the adjustment at the time of energization switching is stopped), whereby the actual rotational speed can be controlled to approach (reach) the target rotational speed by the normal energization control.

Furthermore, by stopping the output of the energization adjustment signal S3 when the set duty is within the error range of the maximum value, it is possible to continue the normal energization control during acceleration or when remaining power exists.

As described above, it is possible to provide the motor driving control device 1 capable of avoiding the resonance with the natural frequency of the motor occurring within the predetermined rotational speed range, and ensuring a desired rotational speed.

In the present embodiment, when the actual rotational speed of the motor 20 is in the predetermined rotational speed range, the controller 4 performs an adjustment by repeating the advance angle and the delay angle at the time of energization switching in a predetermined pattern as the adjustment at the energization switching. The controller 4 outputs the drive control signal S4 (first drive control signal) so as to reduce the power supply current I of the n-th order component at the energization switching frequency n per rotation of the rotor.

As a result, it is possible to provide the motor driving control device 1 capable of avoiding the resonance with the natural frequency of the motor occurring in the predetermined rotational speed range, and reducing the vibration of the motor 20 and the noise accompanying the vibration in spite of an inexpensive configuration.

Furthermore, in the present embodiment, since the energization period is adjusted at the time of energization switching without depending on the modulation rate as in the technique of Japanese Patent Laid-Open No. 2011-55651, the foregoing can be realized by an inexpensive microcomputer (controller).

Furthermore, in the present embodiment, since the controller 4 controls the motor driving unit so as to alternately perform the advance angle adjustment and the delay angle adjustment at the time of energization switching, the power current I of the n-th order component can be reduced by increasing the power supply current I of the (n/2)-th order component. That is, by alternately controlling the advance angle and the delay angle at each energization timing within the predetermined rotational speed range, the magnitude of the current value of the n-th order component corresponding to the energization frequency n per rotation of the rotor can be suppressed. As a result, it is possible to avoid the resonance with the natural frequency of the motor occurring in the predetermined rotational speed range, and it is possible to reduce the vibration of the motor 20 and the noise accompanying the vibration.

Second Embodiment

The circuit configuration of the motor driving control device 1 in a second embodiment is the same as that in FIG. 1. However, the controller 4 and the energization adjusting unit 43 in FIG. 1 perform the following energization control (overlap energization control). The energization control of the present embodiment may be performed instead of the energization control (advance angle/delay angle adjustment control) of the first embodiment or both the energization controls may be used in combination.

As shown in FIG. 1, based on the rotational speed information S2 output from the rotational speed calculator 42, the energization adjusting unit 43 generates an energization adjustment signal S3 for instructing the repeat of an overlap energization operation at the time of energization switching in a predetermined pattern when the actual rotational speed of the motor 20 is within a predetermined rotational speed range. Specifically, in the present embodiment, the energization adjusting unit 43 generates and outputs the energization adjustment signal S3 for instructing to repeat execution and stoppage of the overlap energization at the time of energization switching alternately or in a predetermined pattern at each energization switching timing.

The energization signal generator 44 receives the position detection signal S1, the rotational speed information S2, the energization adjustment signal S3, and the target rotational speed signal St (an example of a signal corresponding to the target rotational speed), and generates a drive control signal S4.

Based on the rotational position information (phase voltages V1, V2, and V3) detected by the rotational position detecting circuit 5, the controller 4 outputs, to the pre-drive circuit 3, the drive control signal S4 (first drive control signal) for performing the adjustment at the time of energization switching by repeating the overlap energization operation at the time of energization switching in a predetermined pattern as the adjustment at the time of energization switching. Furthermore, it is not specifically limited whether the controller 4 fixes the voltage to High or performs switching during an overlap energization period.

Specifically, the controller 4 performs the following adjustment at the time of energization switching.

When the actual rotational speed of the motor 20 is within a predetermined rotational speed range, the controller 4 outputs, to the pre-drive circuit 3, the drive control signal S4 (the first drive control signal) for performing control so as to alternately repeat execution and stoppage of the overlap energization at the time of energization switching. In the present disclosure, a phenomenon occurring once per cycle when one rotation is set as one cycle is regarded as a primary component. A cycle corresponding to the energization switching frequency n per rotation of the rotor is defined as an n-th order component, and the predetermined rotational speed range includes a range in which the n-th order component and the natural frequency of the motor 20 cause a resonance phenomenon.

The controller 4 outputs the drive control signal S4 (the first drive control signal) for performing control so as to alternately repeat execution and stoppage of the overlap energization at the time of energization switching to reduce the power supply current I of the n-th order component corresponding to the energization switching frequency n per rotation of the rotor. As a result, in the motor driving control device 1, the power supply current I of the (n/2)-th order component increases, but the power supply current I of the n-th order component decreases.

The operation of the motor driving control device 1 configured as described above will be described.

First, the basic idea of the present disclosure will be described.

Generally, in order to drive the motor efficiently, the waveform of the power supply current I uniformly should be unified evenly. However, when the waveform of the power supply current I is unified uniformly without unevenness, the energization timings are precisely aligned with one another, and, as a result, a certain rotational order component is generated.

For example, in the case of a brushless motor with 4 poles and 6 slots, 12 energization switching operations occur per rotation. Therefore, when the waveform of the power supply current I is analyzed by FFT (Fast Fourier Transform), ideally only 12-th order component occurs. This 12-th order component resonates with the eigenvalue (natural frequency) of the motor 20, resulting in a large electromagnetic vibration component.

Here, the energization switching frequency per rotation is obtained by multiplying one half of the number of poles by the energization switching frequency per pole (for example, six times in the case of three phases).

The controller 4 of the motor driving control device 1 according to the present disclosure outputs, to the motor driving unit, the drive control signal S4 (the first drive control signal) for performing control so as to alternately repeat execution and stoppage of the overlap energization at the time of energization switching as the adjustment at the time of energization switching within the predetermined rotational speed range. As a result, the n-th order component corresponding to the energization switching frequency n per rotation of the rotor, causing the electromagnetic vibration component, is transferred to another order component, whereby the electromagnetic vibration component can be suppressed.

For example, in the case of the brushless motor with 4 poles and 6 slots, the controller 4 outputs, to the motor driving unit, the drive control signal S4 (the first drive control signal) for performing control so as to alternately repeat the overlap energization at each energization switching timing in a specific rotational speed region where the 12-th order component resonates with the eigenvalue of the motor 20, and controls the energization waveform. As a result, the power supply current I of the sixth order component having a half frequency of the frequency of the 12-th order component increases. The power supply current I of the sixth order component increases whereas the power supply current I of the 12-th order component is suppressed. As a result, it is possible to avoid the resonance with the natural frequency of the motor 20.

Comparative Example

Figure 8A:
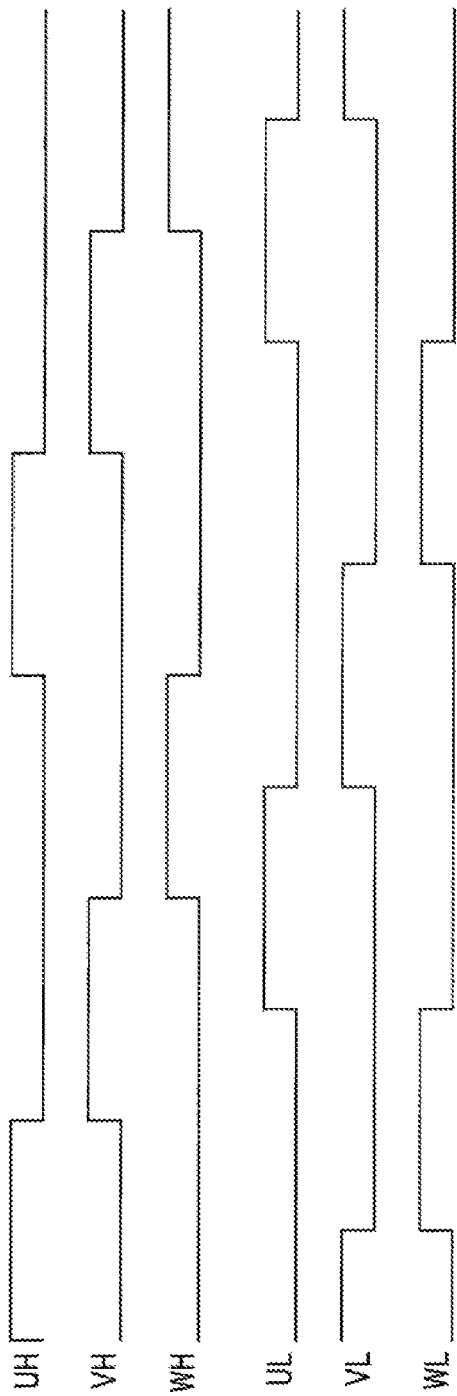
FIGS. 8A and 8B are diagrams showing driving waveforms in the comparative example.
Figure 8B:
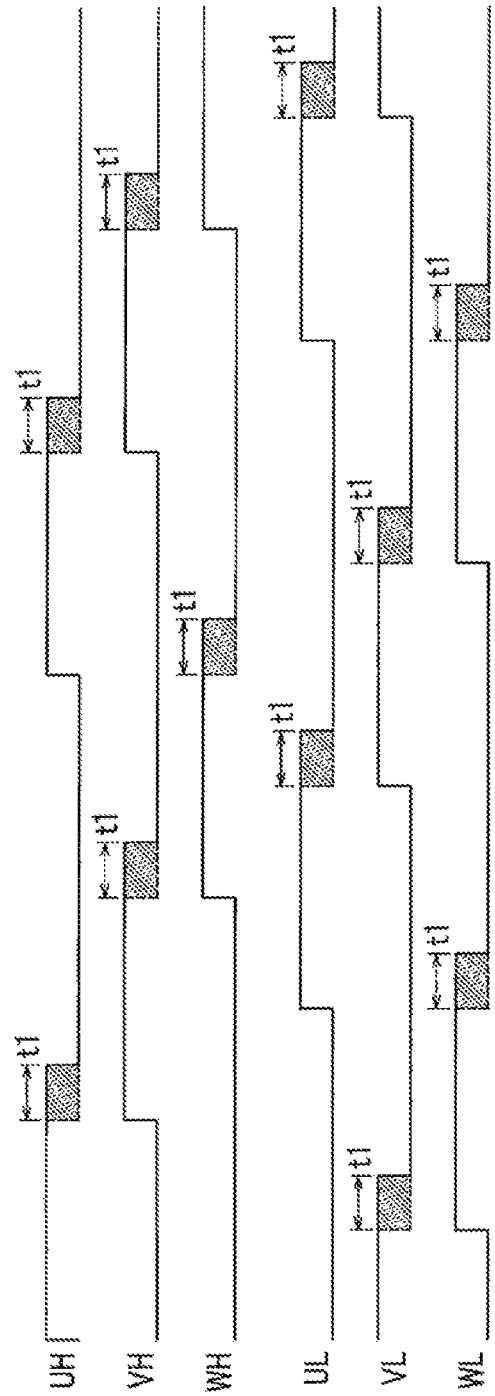

FIGS. 8A and 8B are diagrams showing driving waveforms in the comparative example.

FIG. 8A shows driving waveforms with no overlap.

A waveform UH represents a drive signal Vuu, a waveform VH represents a drive signal Vvu, and a waveform WH represents a drive signal Vwu. The waveforms UH, VH, and WH of these three drive signals repeat H-level in turn with no overlap.

In addition, a waveform UL represents a drive signal Vul, a waveform VL represents a drive signal Vvl, and a waveform WL represents a drive signal Vwl. The waveforms UL, VL, and WL of these three drive signals repeat H-level in turn with no overlap.

Initially, the waveforms UH and VL are set to H-level, and the power supply current I (see FIG. 1) flows from the DC power supply Vd to the ground via the switching element Q1, the coils Lu and Lv, and the switching element Q4.

Next, the waveform VL becomes L-level, the waveform WL becomes H-level, and the power supply current I flows from the DC power supply Vd to the ground via the switching element Q1, the coils Lu and Lw, and the switching element Q6.

Next, the waveform UH becomes L-level, the waveform VH becomes H-level, and the power supply current I flows from the DC power supply Vd to the ground via the switching element Q3, the coils Lv and Lw, and the switching element Q6.

Next, the waveform WL becomes L-level, the waveform UL becomes H-level, and the power supply current I flows from the DC power supply Vd to the ground via the switching element Q3, the coil Lv, Lu and the switching element Q2.

Next, the waveform VH becomes L-level, the waveform WH becomes H-level, and the power supply current I flows from the DC power supply Vd to the ground via the switching element Q5, the coils Lw and Lu, and the switching element Q2.

Finally, the waveform UL becomes L-level, the waveform VL becomes H-level, and the power supply current I flows from the DC power supply Vd to the ground via the switching element Q5, the coils Lw and Lv, and the switching element Q4.

Likewise, the switching elements Q1 to Q6 repeat ON and OFF, whereby the motor 20 rotates. ON/OFF of the switching elements Q1 to Q6 as described above causes increase of the power supply current I of the 12-th order component of the motor 20.

FIG. 8B shows the driving waveforms based on the overlap energization method. The waveforms UH, VH, and WH repeat H-level in turn while overlapping one another. The waveforms UL, VL, and WH repeat H-level in turn while overlapping one another.

Initially, the waveforms UH and VL are set to H-level, and the power supply current I flows from the DC power supply Vd to the ground via the switching element Q1, the coils Lu and Lv, and the switching element Q4.

Next, the waveform WL becomes H-level, and the power supply current I newly also flows from the DC power supply Vd to the ground via the switching element Q1, the coils Lu and Lw, and the switching element Q6. Since the power current I flows into the two systems of the coils Lu, Lv and the coils Lu, Lw while overlapping between the systems as described above, this is called an overlap energization method. Thereafter, when the period t1 has elapsed, the waveform VL becomes L-level and the switching element Q4 turns off. As a result, the power supply current I flows from the DC power supply Vd to the ground only via the switching element Q1, the coils Lu and Lw, and the switching element Q6.

Next, the waveform VH becomes H-level, and the power supply current I also newly flows from the DC power supply Vd to the ground via the switching element Q3, the coils Lv and Lw, and the switching element Q6. That is, the power supply current I flows into the two systems of the coils Lu and Lw and the coils Lv and Lw while overlapping between the systems. Thereafter, when the period t1 has elapsed, the waveform UH becomes L-level, and the switching element Q1 turns off. As a result, the power supply current I flows from the DC power supply Vd to the ground only via the switching element Q3, the coils Lv and Lw, and the switching element Q6.

Next, the waveform UL becomes H-level, and the power supply current I also newly flows from the DC power supply Vd to the ground via the switching element Q3, the coils Lv and Lu, and the switching element Q2. That is, the power supply current I flows into the two systems of the coils Lv and Lw and the coils Lv and Lu while overlapping between the systems. Thereafter, when the period t1 has elapsed, the waveform WL becomes L-level, and the switching element Q6 turns off. As a result, the power supply current I flows from the DC power supply Vd to the ground only via the switching element Q3, the coils Lv and Lu, and the switching element Q2.

Next, the waveform WH becomes H-level, and the power supply current I also newly flows from the DC power supply Vd to the ground via the switching element Q5, the coils Lw and Lu, and the switching element Q2. That is, the power supply current I flows into the two systems of the coils Lv and Lu and the coils Lw and Lu while overlapping between the two systems. Thereafter, when the period t1 has elapsed, the waveform VH becomes L-level, and the switching element Q3 turns off. As a result, the power supply current I flows from the DC power supply Vd to the ground only via the switching element Q5, the coils Lw and Lu, and the switching element Q2.

Finally, the waveform VL becomes H-level, and the power supply current I also newly flows from the DC power supply Vd to the ground via the switching element Q5, the coils Lw and Lv and the switching element Q4. That is, the power supply current I flows into the two systems of the coils Lw and Lu and the coils Lw and Lv while overlapping between the systems. Thereafter, when the period t1 has elapsed, the waveform UL becomes L-level and the switching element Q2 turns off. As a result, the power supply current I flows from the DC power supply Vd to the ground only via the switching element Q5, the coils Lw and Lv, and the switching element Q4.

Likewise, the switching elements Q1 to Q6 repeat ON and OFF, whereby the motor 20 rotates. As described above, the motor driving control device 1 causes the power supply current I of the 12-th order component of the motor 20 to increase by performing the overlap energization in synchronization with the ON and OFF of the switching elements Q1 to Q6.

Embodiment

Next, the operation of the motor driving control device 1 according to the present disclosure will be described.

FIGS. 9A and 9B are diagrams showing driving waveforms in the present embodiment.

The driving waveforms shown in FIG. 9A perform the overlap energization over the period t1 only at the falling time of the waveforms UL, VL, and WL (in other words, at the end time of the energizing period of the switching elements Q2, Q4, and Q6 on the lower arm side). That is, the controller 4 outputs, to the pre-drive circuit 3, the drive control signal S4 (first drive control signal) for performing control so as to alternately repeat execution and stoppage of the overlap energization operation at the time of energization switching. By the overlap energization operation as described above, the power supply current I of the sixth order component of the motor 20 can be increased, and instead the power supply current I of the 12-th order component can be reduced.

The driving waveforms shown in FIG. 9B perform the overlap energization over the period t1 only at the falling time of the waveforms UH, VH, and WH (in other words, at the end time of the energization period of the switching elements Q1, Q3, and Q5 on the upper arm side). That is, the controller 4 outputs, to the pre-drive circuit 3, the drive control signal S4 (first drive control signal) for performing control so as to alternately repeat execution and stoppage of the overlap energization operation at the time of energization switching. By such an overlap energization operation, the power supply current I of the sixth order component of the motor 20 can be increased, and instead the power supply current I of the 12-th order component can be reduced.

Figure 10:
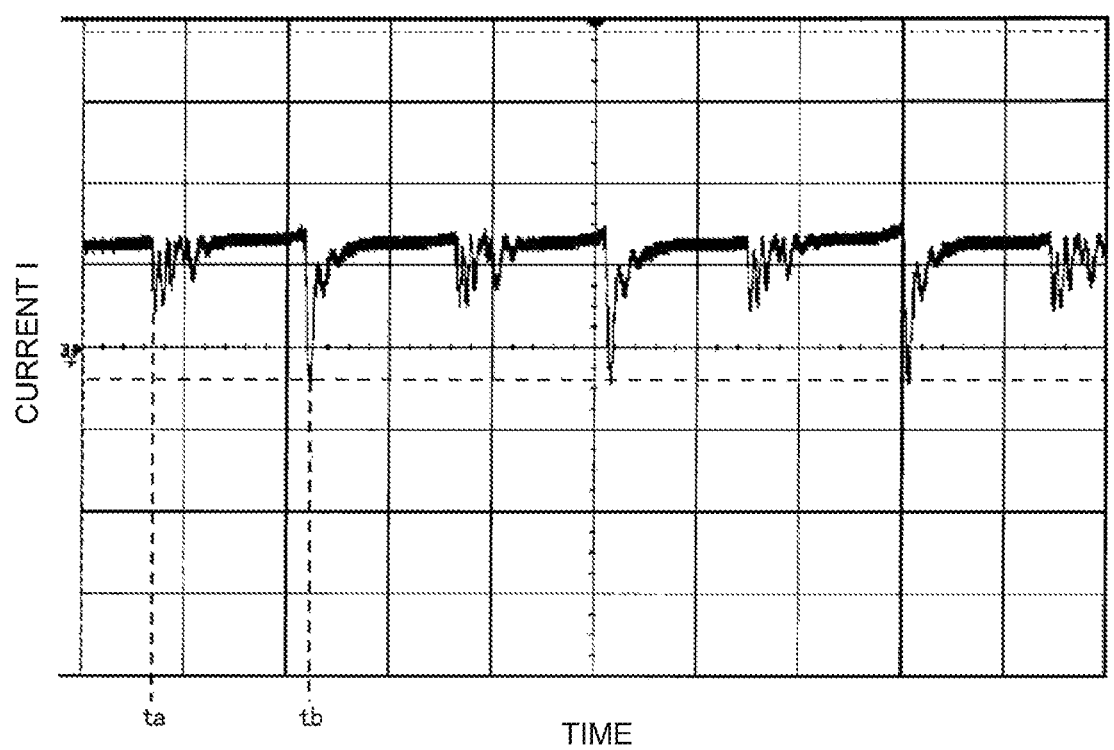
FIG. 10 is a power current waveform diagram of a brushless motor in the second embodiment.

FIG. 10 is a power supply current waveform diagram of a brushless motor in the present embodiment. The ordinate axis of the waveform diagram represents the power supply current I, and the abscissa axis represents the time.

In the power supply current I, small amplitude and large amplitude appear alternately. The small amplitude at a time to is a current value under the overlap energization. The large amplitude at a time tb is a current value when the overlap energization is stopped. As described above, the controller 4 causes the motor driving unit to stop the overlap energization once per two times at the time of energization switching, thereby increasing the amplitude of the power supply current I when stopped. That is, execution of the overlap energization brings an effect of suppressing the amplitude of the power supply current I at the time of energization switching, but by stopping the energization switching once every two times, the amplitude of the power supply current I increases once every two times. By controlling the waveform of the power supply current I at the time of energization switching as described above, it is possible to increase the sixth order component and reduce the 12-th order component.

Figure 11:
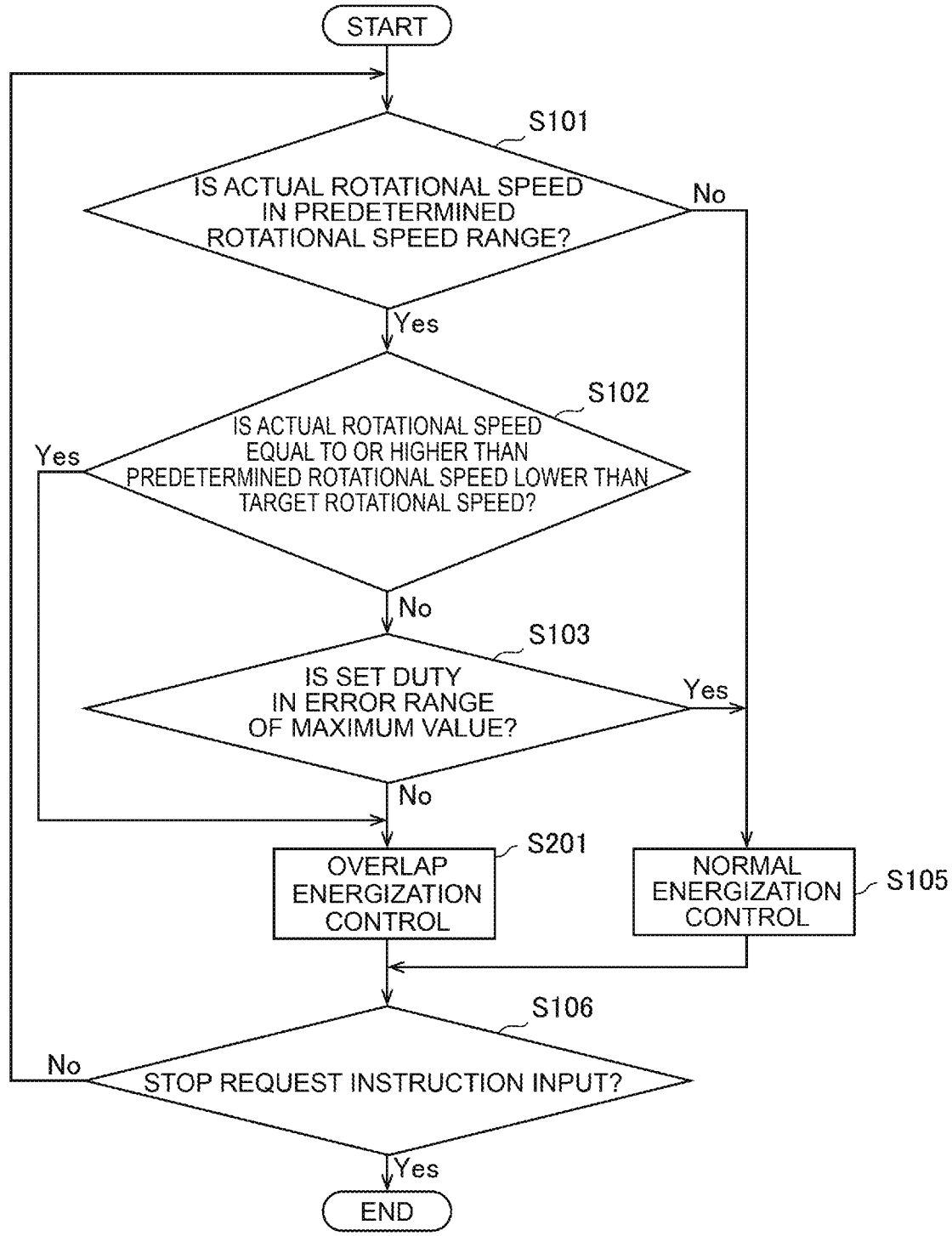
FIG. 11 is a flowchart (main flow) showing energization control of the motor driving control device according to the second embodiment.
Figure 12A:
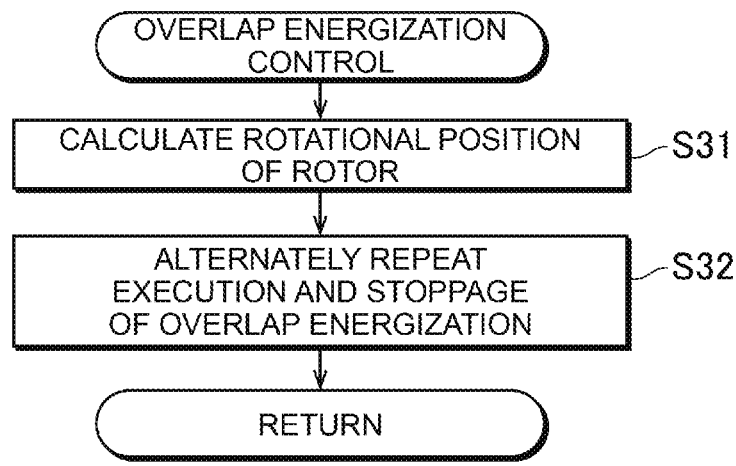
FIGS. 12A and 12B are flowcharts (sub routines) showing energization control of the motor driving control device according to the second embodiment.
Figure 12B:
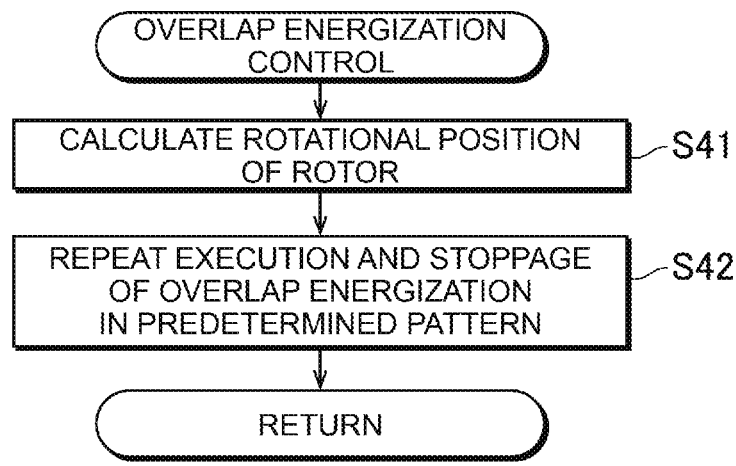

FIG. 11 and FIGS. 12A and 12B are flowcharts showing energization control of the motor driving control device 1 according to the present embodiment. FIG. 11 is a main flow, FIGS. 12A and 12B are flows of the overlap energization control (step 201) of FIG. 11 as a subroutine of FIG. 11, wherein FIG. 12A is a flow of the overlap energization control (step S201) of the present embodiment, and FIG. 12B is a flow of the overlap energization control (step S201)

of a first modification. The flow of FIG. 11 is repeatedly executed at each predetermined timing in the controller 4 (see FIG. 1). Steps for performing the same processing as the flow of FIG. 4 are represented by the same reference signs.

In step S101, the controller 4 determines whether the actual rotational speed of the motor 20 (see FIG. 1) is within a predetermined rotational speed range. The predetermined rotational speed range includes a range described as follows. In the range, the n-th order component corresponding to the energization switching frequency n per rotation of the rotor and the natural frequency of the motor 20 cause a resonance phenomenon. The rotational position calculator 41 (see FIG. 1) generates the position detection signal S1 corresponding to the rotational position information (phase voltages V1, V2, and V3) from the rotational position detecting circuit 5, and the speed calculator 42 calculates the rotational speed based on the position detection signal S1 and generates the rotation speed information S2, whereby the rotational speed of the motor 20 is calculated. Furthermore, the target rotational speed measuring unit 45 receives the target rotational speed information Sc from the outside, measures the target rotational speed, and outputs the target rotational speed signal St corresponding to the target rotational speed to the energization signal generator 44.

When the actual rotational speed of the motor 20 is within the predetermined rotational speed range (Yes in step S101), the controller 4 proceeds to the processing in step S102. When the actual rotational speed of the motor 20 is out of the predetermined rotational speed range (No in step S101), the controller 4 performs the normal energization control (step S105), and then proceeds to the processing in step S106. The normal energization control in step S105 means that the drive control signal S4 (the second drive control signal) for controlling the regular energization switching is output without performing the adjustment at the time of energization switching.

In step S102, the energization signal generator 44 determines whether the actual rotational speed is equal to or higher than the predetermined rotational speed lower than the target rotational speed. As a result, the energization signal generator 44 can determine whether the actual rotational speed has reached an allowable range of the target rotational speed (for example, 98% or more of the target rotational speed). The allowable range (98%) is an example, and is not limited.

When the actual rotational speed of the motor 20 is equal to or higher than the predetermined rotational speed (Yes in step S102), the controller 4 proceeds to the processing of step S201 to perform the overlap energization adjustment. When the actual rotational speed of the motor 20 is less than the predetermined rotational speed (the actual rotational speed is out of the allowable range of the target rotational speed) (No in step S102), the controller 4 proceeds to the processing in step S103.

In step S103, the energization signal generator 44 determines whether the set duty of the drive control signal S4 is within the error range of the maximum value (for example, between 100% and 98% in duty). The error range (from 100% to 98% in duty) is an example, and is not limited.

When the set duty is out of the error range of the maximum value (No in step S103), the controller 4 proceeds to the processing in step S201 to perform the overlap energization adjustment. When the set duty is within the error range of the maximum value (Yes in step S103), the controller 4 performs the normal energization control (step S105), and then proceeds to the processing in step S106.

In order to suppress the electromagnetic vibration component resonating with the natural frequency of the motor 20, in step S201, the controller 4 performs the overlap energization control as the adjustment at the time of energization switching. Specifically, based on the rotational speed information S2 output from the rotational speed calculator 42, the energization adjusting unit 43 (see FIG. 1) generates the energization adjustment signal S3 for instructing to repeat execution and stoppage of the overlap energization at the time of energization switching alternately or in a predetermined pattern when the actual rotational speed of the motor 20 is equal to or higher than the predetermined rotational speed. The energization adjustment signal S3 is a signal for performing the adjustment at the time of energization switching to reduce the resonance between the natural frequency of the motor 20 and the rotational component of the motor 20. The energization signal generator 44 receives the position detection signal S1, the rotational speed information S2 (actual rotational speed), the energization adjustment signal S3, and the target rotational speed signal St and generates the drive control signal S4 (the first drive control signal) for performing control so as to repeat execution and stoppage of the overlap energization at the time of energization switching alternately or in a predetermined pattern.

The foregoing overlap energization control in step S201 forcibly repeats execution and stoppage of the overlap energization alternately or in a predetermined pattern within the predetermined rotational speed range. Details will be described later with reference to FIGS. 12A and 12B.

In step S106, the controller 4 determines whether a stop request instruction is input, and finishes the present flow when the stop request instruction is input (Yes). When the stop request instruction is not input (No), the controller 4 returns to step S101 to determine whether the actual rotational speed of the motor 20 is equal to or higher than the predetermined rotational speed, and continues the processing.

As described above, when the actual rotational speed of the motor 20 is equal to or higher than the predetermined rotational speed, based on the detected rotational position information, the controller 4 outputs, to the pre-drive circuit 3, the drive control signal S4 (the first drive control signal) for controlling the adjustment at the time of energization switching to reduce the resonance between the natural frequency of the motor 20 and the rotational component of the motor 20, and performs the overlap energization control. On the other hand, when the actual rotational speed is less than the predetermined rotational speed and the set duty is within the error range of the maximum value (for example, between 100% and 98% in duty), the controller 4 outputs the drive control signal S4 (the second drive control signal) for controlling the regular energization switching to the pre-drive circuit 3 without performing the adjustment at the time of energization switching (overlap energization control).

Next, the overlap energization control (step S201) of FIG. 11 will be specifically described.

The overlap energization control performs an adjustment by repeating execution and stoppage of the overlap energization at the time of energization switching in a predetermined pattern, and will be exemplified below.

Embodiment

As shown in FIG. 12A, the rotational position calculator 41 calculates the rotational position of the rotor in step S31.

In step S32, the energization adjusting unit 43 alternately repeats execution and stoppage of the overlap energization at the time of energization switching based on the rotational position of the rotor. Specifically, the energization signal generator 44 in the controller 4 receives the position detection signal S1 output from the rotational position calculator 41 and the energization adjustment signal S3 output from the energization adjusting unit 43, generates the drive control signal S4 (the first drive control signal) for performing control so as to alternately repeat execution and stoppage of the overlap energization at the time of energization switching, and outputs the drive control signal S4 to the pre-drive circuit 3.

As a result, the motor driving control device 1 can increase the power supply current I of the (n/2)-th order component and reduce the power supply current I of the n-th order component. For example, the power supply current I of the sixth order component is increased to reduce the power supply current I of the 12-th order component.

«First Modification»

As shown in FIG. 12B, the rotational position calculator 41 calculates the rotational position of the rotor in step S41.

In step S42, the energization adjusting unit 43 performs control so as to repeat execution and stoppage of the overlap energization at the time of energization switching in a predetermined pattern based on the rotational position of the rotor. Specifically, the energization signal generator 44 in the controller 4 receives the position detection signal S1 output from the rotational position calculator 41 and the energization adjusting signal S3 output from the energization adjusting unit 43, generates the drive control signal S4 (the first drive control signal) for performing control so as to repeat execution and stoppage of the overlap energization at the time of energization switching at a predetermined pattern, and outputs the drive control signal S4 to the pre-drive circuit 3. The predetermined pattern is, for example, a pattern of repeating one execution and three stops, a pattern repeating three executions and one stop, and the like, but is not limited to these patterns.

This also makes it possible to reduce the power supply current I of the n-th order component when the energization switching frequency per rotation of the rotor is set to n.

Figure 13:
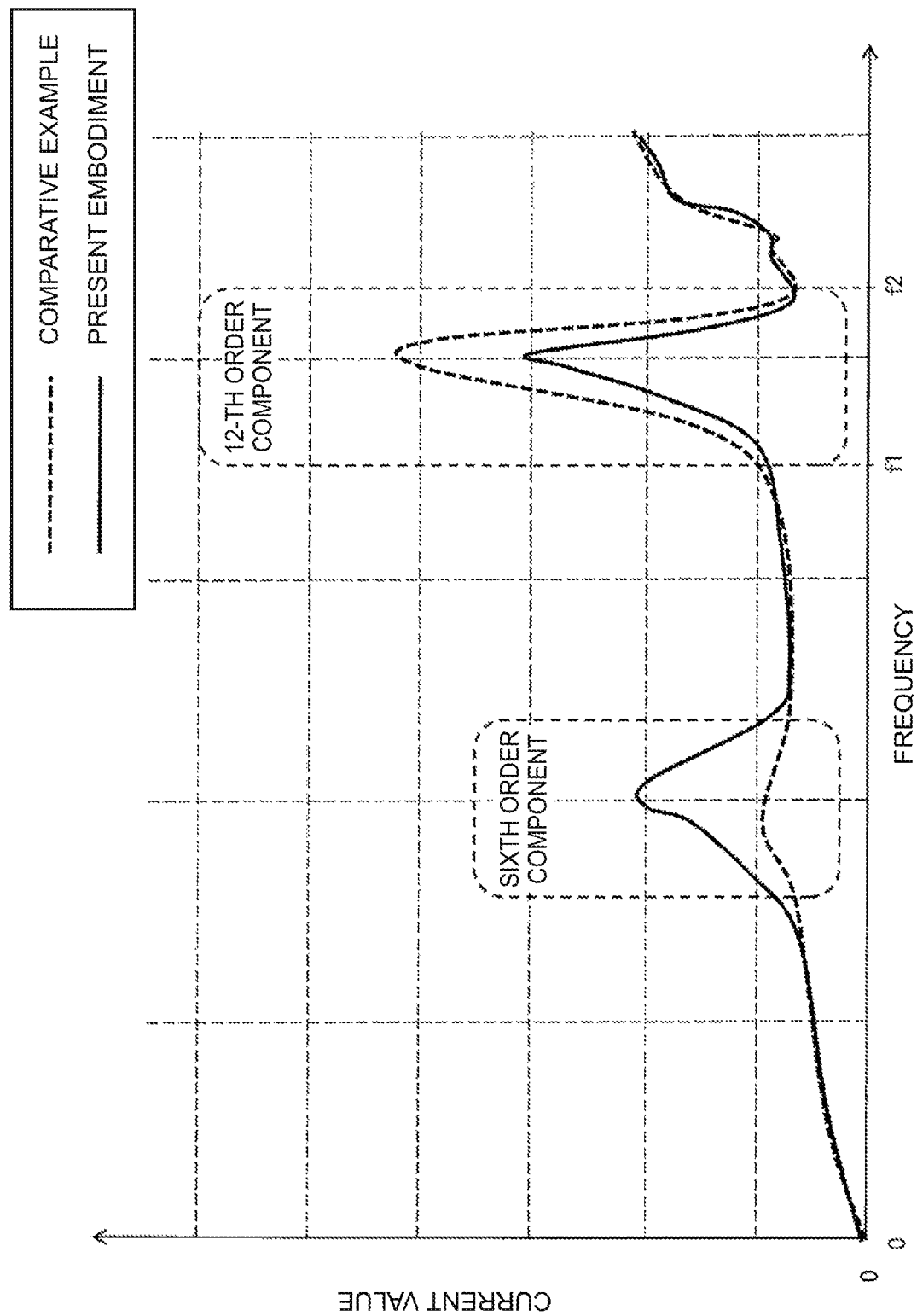
FIG. 13 is a conceptual diagram of the frequency vs. current value characteristic diagram of the motor driving control device.

FIG. 13 is a conceptual diagram showing a frequency vs. current value characteristic of the motor driving control device 1.

FIG. 13 shows the concept of an FFT graph of the waveform of the power supply current I obtained by sweeping the rotational speed in the brushless motor with 4 poles and 6 slots. The ordinate axis of FIG. 13 represents the current value of the power supply current I in FIG. 1, and the abscissa axis represents the frequency. A solid line in FIG. 13 represents the FFT graph of the current waveform of the present embodiment, and a broken line represents the FFT graph of the current waveform of the comparative example.

As shown in the FFT graph of FIG. 13, in the comparative example, the power supply current I of the 12-th order component occurs due to 12 energization switching operations per rotation of the rotor. As described above, the power supply current I of the 12-th order component resonates with the eigenvalue (natural frequency) of the motor 20, and becomes a large electromagnetic vibration component.

In the present embodiment, by alternately repeating execution and stoppage of the overlap energization at the time of energization switching, the power supply current I of the sixth order component is increased to reduce the power supply current I of the 12-th order component.

As the rotational speed of the motor 20 is changed, a phenomenon of resonance with the natural frequency of the motor 20 in the frequency range corresponding to the n-th order component corresponding to the energization switching frequency n occurs in a predetermined rotational speed range. In the present embodiment, the resonance of the n-th order component can be avoided by suppressing the power supply current I in the above frequency range.

As indicated by an enclosed area surrounded by the broken line in FIG. 13, in the motor driving control device 1 of the present embodiment, the current value in the frequency range corresponding to the 12-th order component is suppressed. In FIG. 13, the resonance between the eigenvalue of the motor 20 and the 12-th order component is avoided by alternately repeating execution and stoppage of the overlap energization at the time of energization switching in the section of the predetermined rotational speed range.

However, as shown in FIG. 12, in the motor driving control device 1 of the present embodiment, the sixth order component increases. However, since this sixth order component does not resonate with the eigenvalue (natural frequency) of the motor 20, no electromagnetic vibration component occurs. Also, a frequency region in the vicinity of the sixth order component does not influence the system because current values in the frequency region are small.

Here, a method of calculating the rotational speed range corresponding to the 12-th order component in the present embodiment will be described.

The eigenvalue (natural frequency) of the motor 20 is assumed to be known by a measurement. A large electromagnetic vibration component occurs due to resonance with this natural frequency. In the case of FIG. 13, the resonance point (electromagnetic vibration component) exists between f1 [Hz] and f2 [Hz]. When these frequencies are converted to rotational speeds, they are converted to f1 [Hz]×60÷12=5×f1 [rpm], and f2 [Hz]×60÷12=5×f2 [rpm], respectively.

That is, the lower limit Rmin [rpm] and the upper limit Rmax [rpm] of the rotational speed range corresponding to the frequency range of the n-th order component from f1 [Hz] to f2 [Hz] are equal to (f1×60÷n) [rpm] and (f2×60÷n) [rpm], respectively.

The predetermined rotational speed range is set so as to include at least the rotational speed range corresponding to the n-th order component, that is, a range causing a resonance phenomenon between the n-th order component and the natural frequency of the motor 20.

Figure 14A:
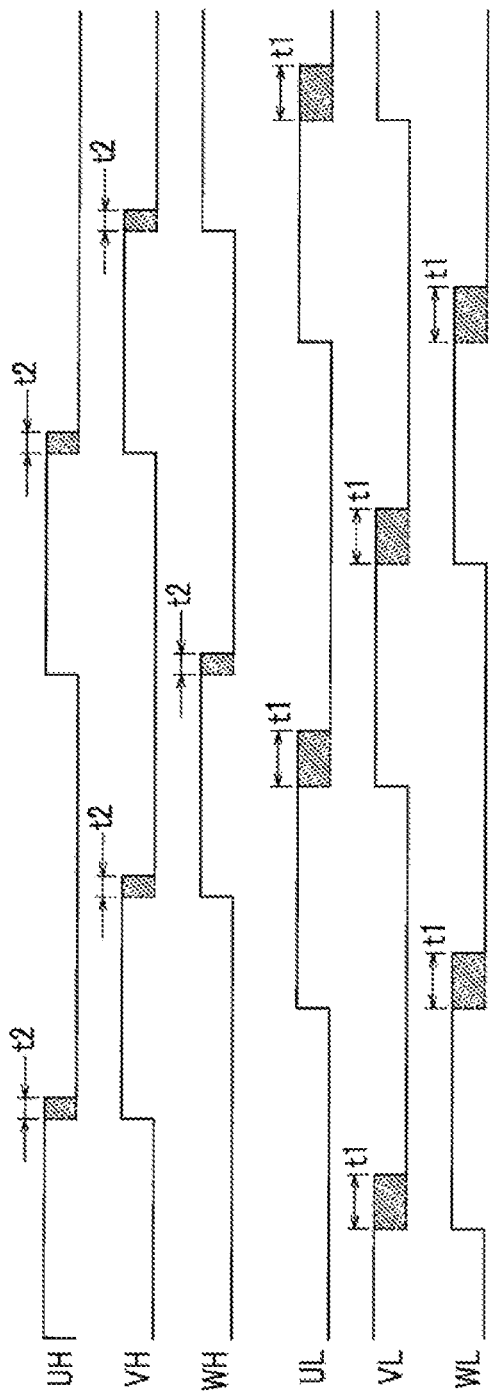
FIGS. 14A and 14B are diagrams showing driving waveforms in a modification.
Figure 14B:
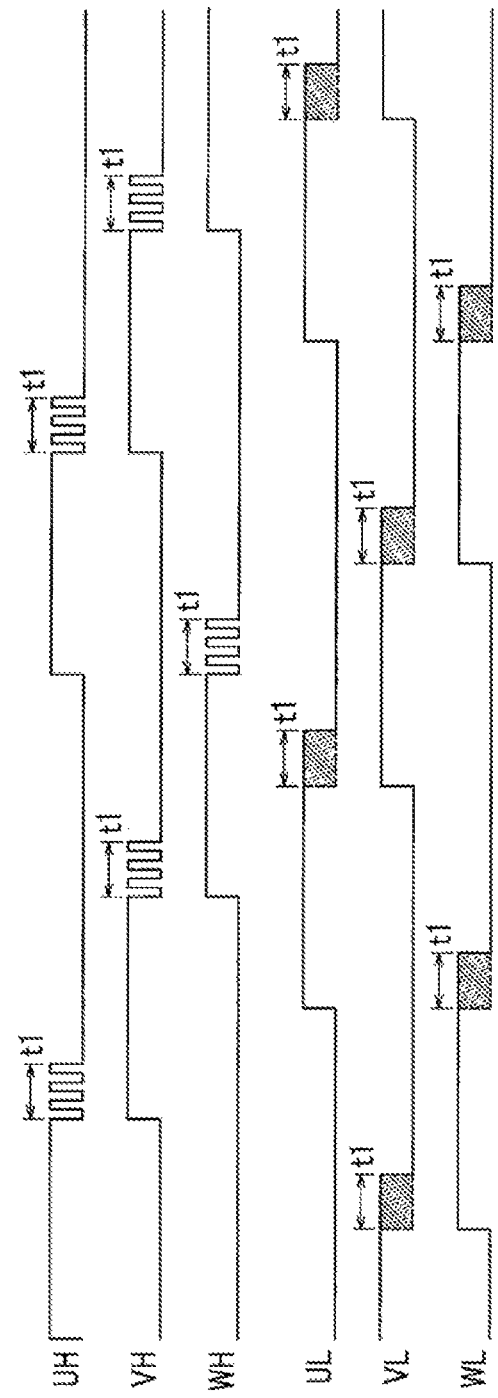

FIGS. 14A and 14B are diagrams showing driving waveforms of modifications.

In FIG. 14A, the controller 4 outputs, to the pre-drive circuit 3, a drive control signal S4 (first drive signal) for performing control so that different predetermined operations are repeated in a predetermined pattern in the overlap energization at the time of energization switching as the adjustment at the time of energization switching.

The driving waveforms of a second modification shown in FIG. 14A perform the overlap energization over a period t2 at the falling time of the waveforms UH, VH, and WH, and over a period t1 at the falling time of the waveforms UL, VL, and WL.

That is, the controller 4 performs control so as to alternately repeat the overlap energization of the period t2 and the overlap energization of the period t1 at the time of energization switching. The controller 4 makes the period t2 shorter than the period t1, thereby making the amplitude of the power supply current I in the period t2 larger than that in the period t1. By appropriately setting the ratio between the period t1 and the period t2, the amplitude of the power supply current I can be increased once per two times of energization switching. The motor driving control device 1 can increase the power supply current I of the sixth order component of the motor 20 by an overlap energization operation of repeating operations having different energization periods in a predetermined pattern as described above as the different predetermined operations in the overlap energization at the time of energization switching, and instead can reduce the power supply current I of the 12-th order component.

The driving waveforms of a third modification shown in FIG. 14B perform the overlap energization with switching at the falling time of the waveforms UH, VH, and WH (in other words, at the end time of the energization period of the switching elements Q1, Q3, and Q5 on the upper arm side), and perform the overlap energization without switching at the falling time of the waveforms UL, VL, WL (in other words, at the end time of the energizing period of the switching elements Q2, Q4, and Q6 on the lower arm side). That is, the controller 4 performs control so as to alternately repeat switching and non-switching operations (an operation with switching and an operation with no switching) in the overlap energization operation at the time of energization switching as the different predetermined operations.

In the overlap energization period with switching, the on-duty and switching frequency of switching pulses are appropriately set. As a result, the controller 4 can make the amplitude of the power supply current I smaller in the period with switching than that in the period with no switching, and increase the amplitude of the power supply current I once per two times of energization switching.

As described above, the different predetermined operations to be repeated in the predetermined pattern in the overlap energization at the time of energization switching upon output of the drive control signal S4 (the first drive control signal) from the controller 4 include the operations having different overlap energization periods and/or the operation with switching and the operation with no switching during the overlap energization. Through the overlap energization operation as described above, the motor driving control device 1 can increase the power supply current I of the sixth order component of the motor 20, and instead can reduce the power supply current I of the 12-th order component.

Figure 15A:
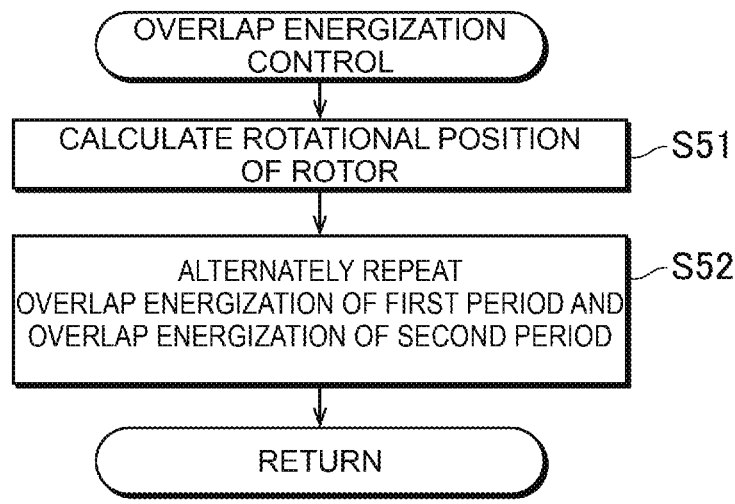
FIGS. 15A and 15B are flowcharts (sub routines) showing energization control of the motor driving control device in the modification.
Figure 15B:
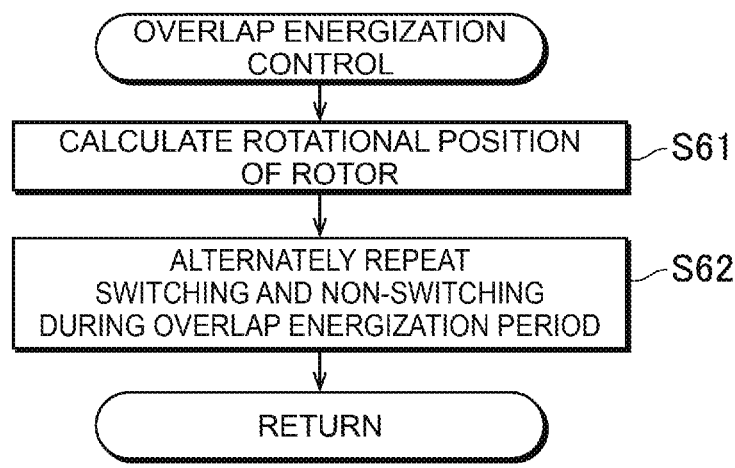

FIGS. 15A and 15B are flowcharts (subroutines) showing the energization control of the motor driving control device 1 according to the modifications. FIGS. 15A and 15B are flows of the overlap energization control (step 201) of FIG. 11 as a subroutine of FIG. 11, wherein FIG. 15A shows a flow of the overlap energization control (step S 201) of the second modification, and FIG. 15B shows a flow of the overlap energization control (step S201) of the third modification. In the second and third modifications, the energization switching based on the main flow shown in FIG. 11 is performed, and the flows shown in FIGS. 15A and 15B are invoked as the subroutines.

As shown in FIG. 15A, the rotational position calculator 41 calculates the rotational position of the rotor in step S51.

In step S52, the energization adjusting unit 43 performs control so as to alternately repeat the overlap energization of the first period (period t1) and the overlap energization of the second period (period t2) at the time of energization switching based on the rotational position of the rotor. Specifically, the energization signal generator 44 in the controller 4 receives the position detection signal S1 output from the rotational position calculator 41 and the energization adjustment signal S3 output from the energization adjusting unit 13, generates the drive control signal S4 (first drive control signal) for performing control so as to alternately repeat the overlap energization of the first period (period t1) and the overlap energization of the second period (period t2) at the time of energization switching, and outputs the drive control signal S4 to the pre-drive circuit 3, whereby the waveforms shown in FIG. 14A are generated.

As a result, the motor driving control device 1 can reduce the power supply current I of the n-th order component by increasing the power supply current I of the (n/2)-th order component. For example, the motor driving control device 1 can reduce the power supply current I of the 12-th order component by increasing the power supply current I of the sixth order component.

As shown in FIG. 15B, the rotational position calculator 41 calculates the rotational position of the rotor in step S61.

In step S62, the energization adjusting unit 43 performs control so as to alternately repeat switching and non-switching in the overlap energization operation at the time of energization switching based on the rotational position of the rotor. Specifically, the energization signal generator 44 in the controller 4 receives the position detection signal S1 output from the rotational position calculator 41 and the energization adjustment signal S3 output from the energization adjusting unit 13, generates the drive control signal S4 (the first drive control signal) for performing control so as to alternately repeat switching and non-switching in the overlap energization operation at the time of energization switching, and outputs the drive control signal S4 to the pre-drive circuit 3, whereby the waveforms shown in FIG. 14B are generated.

As a result, the motor driving control device 1 can reduce the power supply current I of the n-th order component when the energization switching frequency per rotation of the rotor is set to n.

As described above, in the motor driving control device 1 according to the present embodiment, as in the case of the first embodiment, when the actual rotational speed is equal to or higher than the predetermined rotational speed lower than the target rotational speed, the controller 4 outputs the drive control signal S4 (first drive control) for controlling the adjustment at the time of energization switching to reduce the resonance between the natural frequency of the motor 20 and the rotational component of the motor 20 based on the rotational position information detected by the rotational position detecting circuit 5. On the other hand, when the actual rotation speed is less than the predetermined rotational speed lower than the target rotational speed and the set duty is within the error range of the maximum value, the controller 4 outputs the drive control signal S4 (second drive control signal) for controlling the regular energization switching without performing the adjustment at the time of energization switching.

Here, since the overlap energization control at the time of energization switching disturbs the energization waveform, the efficiency may decrease and it is difficult to obtain a desired rotational speed. In the present embodiment, when the actual rotational speed of the motor 20 is equal to or higher than the predetermined rotational speed lower than the target rotational speed, the controller 4 outputs the first drive control signal as the drive control signal S4 to maintain the overlap energization control. On the other hand, when the actual rotational speed of the motor 20 is less than the predetermined rotational speed lower than the target rotational speed and the set duty is within the error range of the maximum value, the controller 4 outputs the second drive control signal as the drive control signal S4 to return to the normal energization control. This makes it possible to avoid the resonance with the natural frequency of the motor 20 in the predetermined rotational speed range after the actual rotational speed approaches the target rotational speed.

Particularly, when it is determined that the actual rotational speed cannot be controlled to be equal to or higher than the predetermined rotational speed lower than the target rotational speed (including the meaning that the set duty is equal to the upper limit value and no remaining power exists), by stopping the output of the energization adjustment signal S3 (stopping the adjustment at the time of energization switching), it is possible to perform the control with the normal energization control so that the actual rotational speed approaches (reaches) the target rotational speed.

In the present embodiment, when the actual rotational speed of the motor 20 is equal to or higher than the predetermined rotational speed lower than the target rotational speed, the controller 4 outputs the drive control signal S4 (first drive control signal) for controlling the adjustment at the time of energization switching, and maintains the overlap energization operation. On the other hand, when the actual rotational speed of the motor 20 is less than the predetermined rotational speed lower than the target rotational speed and the set duty is within the error range of the maximum value, the controller 4 outputs the drive control signal S4 (second drive control signal) for controlling the regular energization switching without performing the adjustment at the time of energization switching. This makes it possible to avoid the resonance with the natural frequency of the motor in the predetermined rotational speed range after approaching the actual rotational speed to the target rotational speed.

As described above, as in the case of the first embodiment, it is possible to provide the motor driving control device 1 capable of avoiding the resonance with the natural frequency of the motor occurring within the predetermined rotational speed range, and securing a desired rotational speed.

(Modifications)

The present disclosure is not limited to the above-described embodiments, and modifications may be performed within a scope not deviating from the subject matter of the present disclosure, and include the following (a) to (l), for example.

(a) The adjustment at the time of energization switching is not limited to the method based on the advance angle/delay angle adjustment or the overlap energization control described as the foregoing embodiments, but includes other methods of the adjustment at the time of energization switching capable of reducing the resonance between the natural frequency of the motor and the rotational component of the motor.

(b) The predetermined rotational speed range should be appropriately set depending on the resonance point with the natural frequency of the motor to be used, and is not uniquely limited. The first embodiment is characterized in that the advance angle adjustment and the delay angle adjustment are forcibly repeated in a predetermined pattern at the time of energization switching. The second embodiment is characterized in that the overlap energization operation is repeated in a predetermined pattern at the time of energization switching. Therefore, the first and second embodiments can be applied in any rotational speed range.

(c) At least some of the constituent elements of the motor driving control device may not be processing based on hardware, but may be processing based on software.

(d) In the present embodiment, the motor 20 is described as the brushless motor with 6 poles and 9 slots, but the number of poles, the number of slots, and the type of motor are not particularly limited, for example, as a brushless motor with 4 poles and 6 slots. Also, the number of phases of the motor 20 is not particularly limited.

(e) The rotational position detecting circuit is not limited to the present embodiment (the back electromotive force detecting circuit), and may be, for example, a Hall sensor or the like. The rotational position information is not limited to the phase voltage.

(f) At least a part of the motor driving control device may be an integrated circuit (IC: Integrated Circuit).

(g) The circuit block configuration of the motor driving control device shown in FIG. 1 is a specific example, and the motor driving control device is not limited to this configuration.

(h) The control flows shown in FIG. 4, FIGS. 5A and 5B, FIG. 11, FIGS. 12A and 12B and FIGS. 15A and 15B are merely examples and are not limited to the processing of these steps. For example, other processing may be inserted between the steps.

(i) The overlap amount (time) may be arbitrarily adjusted so as to be an appropriate value.

(j) The present disclosure is not limited to the 120-degree energization operation.

(k) Change of the overlap time and the presence or absence of switching may be combined.

(l) In the modification shown in FIGS. 14A and 14B, the operations of the upper and lower arm sides may be interchanged by each other.

What is claimed is:

1. A motor driving control device comprising:
a motor driving unit for applying a voltage to each phase of a motor to drive the motor;
a rotational position detecting circuit for detecting a rotational position of a rotor and generating rotational position information; and
a controller for outputting a drive control signal for controlling driving of the motor driving unit to the motor driving unit, wherein the controller outputs, to the motor driving unit, a first drive control signal as the drive control signal for controlling an adjustment at a time of energization switching to reduce resonance between a natural frequency of the motor and a rotational component of the motor based on the rotational position information detected by the rotational position detecting circuit when an actual rotational speed of the motor is equal to or higher than a predetermined rotational speed lower than a target rotational speed, and outputs, to the driving unit, a second drive control signal as the drive control signal for controlling regular energization switching without performing the adjustment at the time of energization switching when the actual rotational speed is less than the predetermined rotational speed and a set duty is within an error range of a maximum value.

2. The motor driving control device according to claim 1, wherein the controller outputs the first drive control signal to the motor driving unit when the set duty of the drive control signal is out of an error range of a maximum value.

3. The motor driving control device according to claim 1, wherein the predetermined rotational speed is included in a predetermined rotational speed range.

4. The motor driving control device according to claim 3, wherein the rotational component of the motor is an n-th order component corresponding to an energization switching frequency n per rotation of the rotor, and the predetermined rotational speed range includes a range causing a resonance phenomenon between the n-th order component corresponding to the energization switching frequency n per rotation of the rotor and the natural frequency of the motor.

5. The motor driving control device according to claim 4, wherein the controller outputs the first drive control signal so as to reduce power supply current of the n-th order component.

6. The motor driving control device according to claim 4, wherein the controller increases power supply current of an (n/2)-th order component to reduce power supply current of the n-th order component.

7. The motor driving control device according to claim 1, wherein the controller outputs, to the motor driving unit, a drive control signal as the first drive control signal for performing the adjustment at the time of energization switching for performing an adjustment by repeating advance angle and delay angle at a time of energization switching in a predetermined pattern.

8. The motor driving control device according to claim 7, wherein the controller controls the motor driving unit to alternately perform the advance angle adjustment and the delay angle adjustment at the time of energization switching as the adjustment at the time of energization switching.

9. The motor driving control device according to claim 1, wherein the controller outputs, to the motor driving unit, the drive control signal as the first drive control signal for performing the adjustment at the time of energization switching for performing an adjustment by repeating an overlap energization operation at a time of energization switching in a predetermined pattern.

10. The motor driving control device according to claim 9, wherein the controller outputs the drive control signal for performing control so as to alternately repeat execution and stoppage of the overlap energization at the time of energization switching as the adjustment at the time of energization switching.

11. The motor driving control device according to claim 9, wherein the controller outputs the drive control signal for performing control so as to repeat different predetermined operations in a predetermined pattern in the overlap energization at the time of energization switching.

12. The motor driving control device according to claim 11, wherein the different predetermined operations include operations having different overlap energization periods, and/or operations having presence or absence of switching during the overlap energization.

13. The motor driving control device according to claim 1, wherein the controller comprises:
- a rotational speed calculator for calculating an actual rotational speed based on a signal corresponding to the rotational position information;
- an energization adjusting unit for outputting an energization adjustment signal for performing the adjustment at the time of energization switching when an actual rotational speed output from the rotational speed calculator is equal to or higher than the predetermined rotational speed lower than the target rotational speed, and outputting no energization adjustment signal when the actual rotational speed is less than the predetermined rotational speed and the set duty is within the error range of the maximum value; and
- an energization signal generator for generating and outputting to the motor driving unit the first drive control signal or the second drive control signal based on a signal corresponding to the rotational position information, the actual rotational speed, the energization adjustment signal and a signal corresponding to the target rotational speed.

* * * * *